(12) United States Patent
White

(10) Patent No.: US 7,845,513 B2
(45) Date of Patent: Dec. 7, 2010

(54) BEVERAGE CONTAINER OR CONTAINER LID WITH DRINKING STRAW

(76) Inventor: Francetta Jamese Estes White, 49 Ben White Dr., Hilton Head Island, SC (US) 29926

( * ) Notice: Subject to any disclaimer, the term of this patent is extended or adjusted under 35 U.S.C. 154(b) by 171 days.

(21) Appl. No.: 11/356,604

(22) Filed: Feb. 17, 2006

(65) Prior Publication Data
US 2006/0180593 A1 Aug. 17, 2006

(51) Int. Cl.
A47G 19/22 (2006.01)
(52) U.S. Cl. .................. 220/705; 220/708; 220/735; 220/710; 215/388
(58) Field of Classification Search ............ 220/710, 220/708, 705, 735; 215/388
See application file for complete search history.

(56) References Cited

U.S. PATENT DOCUMENTS

| | | | | |
|---|---|---|---|---|
| 214,617 A | * | 4/1879 | Brown | 239/33 |
| 580,527 A | * | 4/1897 | Martin | 210/251 |
| 1,996,203 A | | 4/1935 | Hollingsworth | |
| 2,036,706 A | | 4/1936 | Law | |
| 2,139,838 A | * | 12/1938 | Mayer | 131/243 |
| 2,395,734 A | * | 2/1946 | Georgopoulos | 229/103.1 |
| 2,800,978 A | | 8/1952 | DeMarco, Jr. | |
| 2,975,925 A | | 3/1961 | Chambers | |
| 3,153,415 A | | 10/1964 | Sheridan | |
| 3,172,561 A | | 3/1965 | Schwartz | |
| 3,332,567 A | * | 7/1967 | Pugh, Sr. | 215/388 |
| 3,384,257 A | | 5/1968 | Fourqurean | |
| 3,445,033 A | * | 5/1969 | Sweet et. al. | 220/705 |
| D217,317 S | | 4/1970 | Homorodean, Jr. et al. | |
| 3,517,884 A | * | 6/1970 | Horvath | 239/33 |
| 3,545,980 A | * | 12/1970 | Stanger | 426/85 |
| 3,645,262 A | | 2/1972 | Harrigan | |
| 3,757,784 A | | 9/1973 | Avery | |
| 3,780,944 A | | 12/1973 | Zubalik | |
| 3,946,652 A | * | 3/1976 | Gorin | 99/323 |
| 4,033,453 A | * | 7/1977 | Giaimo | 206/217 |
| 4,095,710 A | * | 6/1978 | Tomiati | 220/708 |
| 4,153,170 A | | 5/1979 | Aquarian | |
| 4,191,302 A | | 3/1980 | Fiducia | |
| 4,247,016 A | * | 1/1981 | Shaw | 220/708 |
| 4,356,927 A | * | 11/1982 | Cooper et al. | 220/710 |
| D269,659 S | | 7/1983 | Holloway | |
| 4,463,859 A | | 8/1984 | Greene | |
| 4,505,310 A | | 3/1985 | Schneider | |
| D279,250 S | | 6/1985 | Holloway | |
| 4,573,631 A | * | 3/1986 | Reeves | 229/404 |
| 4,629,098 A | | 12/1986 | Eger | |

(Continued)

FOREIGN PATENT DOCUMENTS

GB  2198622 A  6/1988

(Continued)

OTHER PUBLICATIONS www.hiltonheadcontainer.com.

*Primary Examiner*—Anthony Stashick
*Assistant Examiner*—Christopher B McKinley

(57) ABSTRACT

A beverage straw-containing device includes: (a) a generally circular-shaped beverage container lid; (b) a generally circular-shaped beverage container; and (c) a bendable or flexible straw, the straw being ring-shaped, coiled, or angled in its storage position and removably encased within, or detachably attached directly or indirectly to, the beverage container lid and/or the beverage container.

18 Claims, 15 Drawing Sheets

U.S. PATENT DOCUMENTS

| | | | |
|---|---|---|---|
| 4,728,001 A * | 3/1988 | Serba | 220/705 |
| 4,795,028 A * | 1/1989 | Wittig et al. | 206/217 |
| 4,813,933 A | 3/1989 | Turner | |
| 4,830,204 A * | 5/1989 | Lin | 215/389 |
| 4,898,290 A | 2/1990 | Cueto | |
| 4,966,580 A | 10/1990 | Turner et al. | |
| 4,969,564 A | 11/1990 | Cohen et al. | |
| 4,994,076 A | 2/1991 | Guss | |
| 5,040,719 A * | 8/1991 | Ballway | 220/738 |
| 5,048,705 A | 9/1991 | Lynd et al. | |
| 5,049,127 A | 9/1991 | Yen Tseng | |
| 5,057,077 A | 10/1991 | Turner et al. | |
| 5,105,956 A | 4/1992 | Tarng-Lin | |
| 5,148,971 A | 9/1992 | Ahn | |
| 5,150,811 A * | 9/1992 | Kelston | 220/710 |
| 5,215,231 A | 6/1993 | Paczonay | |
| 5,221,016 A | 6/1993 | Karpal | |
| 5,234,117 A | 8/1993 | Garvin | |
| 5,353,983 A * | 10/1994 | Miller | 229/103.1 |
| 5,388,712 A | 2/1995 | Brody | |
| 5,398,853 A | 3/1995 | Latham | |
| D360,558 S | 7/1995 | Appleman | |
| 5,439,125 A | 8/1995 | Bloch | |
| 5,462,101 A | 10/1995 | Mouchmouchian | |
| 5,478,325 A | 12/1995 | Fu-Hsiang | |
| 5,509,605 A | 4/1996 | Cripe | |
| 5,525,383 A * | 6/1996 | Witkowski | 428/30 |
| D378,975 S | 4/1997 | Reid | |
| 5,682,931 A | 11/1997 | Mouchmouchian | |
| 5,693,033 A | 12/1997 | Nita | |
| D392,886 S * | 3/1998 | Yanes | D9/436 |
| 5,722,219 A * | 3/1998 | Dobransky | 53/461 |
| 5,749,483 A | 5/1998 | Tebeau | |
| 5,873,474 A | 2/1999 | Gray | |
| D407,946 S | 4/1999 | Brewer et al. | |
| 5,890,636 A | 4/1999 | Kibbe | |
| D425,756 S | 5/2000 | Lipson | |
| 6,076,967 A | 6/2000 | Beaudette | |
| 6,109,515 A | 8/2000 | Duboff | |
| 6,109,538 A | 8/2000 | Villani et al. | |
| 6,126,679 A | 10/2000 | Botts | |
| 6,158,155 A | 12/2000 | Boney | |
| 6,168,042 B1 * | 1/2001 | Kalagian | 220/705 |
| 6,431,434 B1 | 8/2002 | Haughton et al. | |
| 6,561,434 B2 * | 5/2003 | Kaplan | 239/33 |
| 6,565,899 B1 | 5/2003 | Cecere | |
| 6,460,777 B2 | 10/2003 | Float et al. | |
| 6,652,144 B2 | 11/2003 | Stefandl | |
| D487,375 S | 3/2004 | Bengtsson et al. | |
| 6,732,882 B2 | 5/2004 | Belcastro | |
| 6,739,933 B2 | 5/2004 | Taylor | |
| 6,824,003 B1 | 11/2004 | Wong | |
| 7,021,490 B2 * | 4/2006 | Lipson | 220/709 |
| 7,172,085 B2 | 2/2007 | Beaudette | |
| 2001/0019062 A1 * | 9/2001 | Kalagian | 220/705 |
| 2002/0090423 A1 * | 7/2002 | Schecter | 426/104 |
| 2003/0042324 A1 | 3/2003 | Ho | |
| 2003/0087005 A1 | 5/2003 | Baron | |
| 2003/0203075 A1 | 10/2003 | Taylor | |
| 2003/0232111 A1 | 12/2003 | Sanso | |
| 2004/0013772 A1 | 1/2004 | Weiss et al. | |
| 2004/0045169 A1 | 3/2004 | Boettner et al. | |
| 2004/0069862 A1 | 4/2004 | Sheedy | |
| 2004/0137139 A1 | 7/2004 | Diamond et al. | |
| 2004/0245257 A1 * | 12/2004 | Lipson | 220/709 |
| 2004/0256015 A1 | 12/2004 | Margetson | |
| 2005/0037112 A1 | 2/2005 | Daley et al. | |
| 2006/0076252 A1 | 4/2006 | Witkowski | |
| 2006/0175248 A1 | 8/2006 | Raimondo et al. | |

FOREIGN PATENT DOCUMENTS

| | | | |
|---|---|---|---|
| GB | 2198622 A * | 8/1988 | |
| JP | 2004-024408 | 1/2004 | |

* cited by examiner

BEVERAGE CONTAINER OR CONTAINER LID WITH DRINKING STRAW

CROSS REFERENCE TO RELATED DOCUMENT

Benefit is claimed under 35 USC 119(e) of provisional U.S. patent application No. 60/653,721, filed on Feb. 17, 2005.

BACKGROUND OF THE INVENTION

1 Technical Field

The present device relates generally to a unitary, reusable beverage straw-containing device, more particularly a unitary beverage cup or a cup lid device with a removable bendable drinking straw removably enclosed within the cup or cup lid prior to use of the cup or cup lid and straw, and replaceable within the cup or cup lid after use.

2 Background Information

Currently, the great majority of beverage containers used by restaurants, particularly fast food establishments, are disposable beverage cups with separate, disposable lids and individual, disposable drinking straws. Conventional disposable beverage containers, container lids, and drinking straws are often separately stored in specially-designed storage containers. Sometimes, each beverage container, container lid, and drinking straw is separately packaged using disposable materials. For example, straight drinking straws are often wrapped in paper, which is peeled off just prior to use of the straw.

Often in fast food establishments, a customer who purchases a soda, coffee, or other beverage drink is able to dispense his or her own drink by filling a lightweight, disposable container with the chosen beverage. The customer must then set the full beverage container down on a countertop in order to apply a disposable container lid onto the lip of the container without spilling the beverage. ("Lip" is a term of art usually denoting the uppermost part of a container where the user's lip is placed, but used in this application it also means the lowermost part of a container—bottom lip of cup 36—as depicted in FIG. 15.) Finally, it is common for the customer to peel a wrapper from a straw and insert it into a slot in the container lid. The present invention does not interrupt the integrity of currently available beverage container and container lid designs. By not interrupting the integrity of currently available designs, it is meant that the present invention is manufactured so that the straw fits "hand-in-glove" in a specially-designed and -constructed location on the device. Also by not interrupting the integrity of currently available designs, the present invention integrates the construction of the container or the container's lid and straw, when the container and the container's lid are integral. The present invention does this by modifying the container and/or its integral container lid to create a specially-designed location that encases or encloses the straw to secure it in storage until the user removes the straw for use or reuse. Accordingly, an objective of the present invention is to meld form with fun and function, rather than disturb the integrity of the design. Unlike prior art (Lin/Cooper/Sweet/Kalagian/Tomiati) that teaches the straw "attached to" or "mounted on" a device, the present invention teaches the straw encased within specially designed locations on specially designed containers. Based on the above, the current invention, then, teaches a device that is visually appealing, structurally secure, reusable (sustainable through multiple uses) and therefore, maintains the continuity, rather than interrupts, the integrity of currently available beverage container and container lid designs.

Currently, most drinking straws are packaged separately and are inserted vertically into the beverage container by the end user. Drinking straws typically are inserted in a pre-cut slot that may or may not be located in the center of the lid. Commonly available, relatively rigid drinking straws often present a challenge when the user is trying to extract residual beverage from the bottom of the container. Furthermore, contact between the straw and the user's mouth is often awkward. A device is needed that will furnish a customer with a unitary straw-containing device that is more convenient and less awkward in use. By convenient and less awkward in use, it is meant that where the device is a unitary container and straw, the straw is encased flexibly in a generally ring-shaped, coiled (spiral). or angled manner within a specially-designed channel located on a horizontal surface of the container. That is, there is a need for a beverage straw-containing device where the device is unitary and integrally constructed, such that the length of the straw is proportional at all times to the container/lid device. Alternatively, the straw is removably enclosed in a ring-shaped coiled, or angled manner within a tube called a channel enclosure. Similarly, where the device is a unitary container lid and straw, the straw is removably enclosed in a generally ring-shaped, coiled, or angled manner within the specially designed channel enclosure located within a horizontal surface of the container lid. The present invention teaches a straw-containing device that is structurally conformed for the straw or form-fitted—for the straw to fit "hand-in-glove"—rather than awkwardly with the container/container lid. The units of the present invention can be packaged so that the number of separate items required for beverage dispensing is reduced from three units (container, straw, and lid) to one, or less preferably two, units. In other words, the beverage straw-containing devices of this invention are of two- or three-piece construction, yet unitary, in that are they are packaged, preferably as one unit or two units, rather than three separately packaged units.

There also is a need for a straw-containing device that is adaptable to multiple use (reusable) applications. For example, a drinking straw may be permanently affixed to a multiple use drinking container, principally for use by a child. Many of these containers, however, while convenient, are difficult to clean and maintain in a sanitary condition. The integrity of the present invention rests in its secure, reusable construction, yet separability from the container, creating in its reusable embodiment an opportunity for the user to clean and sanitize the separate parts by hand or with the use of a dishwasher. Consequently, a straw-containing device is needed where the straw is more convenient, novel, and not obstructive in storage, but when extracted from storage and reshaped by the user, it is hygienic, comfortable in use, and reuse. The device of the current invention more appropriately teaches a device of sustainable long-term, multiple home, outdoor, and office use. In its multiple use or reusable application, the invention of the current device would be manufactured for the gifts/novelty items market that has a higher price point than taught by prior art. The device of the current invention also can be made of eco-friendly or sustainable materials such as durable plastic or composites. Alternatively, the device can be made of a combination of plastic or other bendable, flexible resins for the straw, with the straw encased by or enclosed within glass, plastic, or metal devices that are washable by hand or by use of a dishwashing appliance—commercial or residential.

Whether in the home or on the go, children and adults often drink from containers with straws because of their novelty or convenience, or because of an inability to drink conventionally from a container. The present invention allows a person to drink from a disposable or reusable container with a drinking straw that is convenient to access, and unlikely to be separated from the container or lost in transit from, for example, a fast food restaurant counter to a table in the fast food restaurant. Similarly, users will appreciate the convenience of a storage place specially designed for the straw in the reusable manner of the current invention. They also will appreciate that each item (cup or lid and straw) may be separated for cleaning, and later combined for safe-keeping and storage for use at a later time. The present invention is an improvement over Pugh and Kalagian in that Pugh's and Kalagian's devices are designed for single use only. The present invention also is adaptable to the variety of containers, such as cups, mugs, jugs, bottles, and cans, and container lid designs and materials utilized in the beverage industry. In the applications or embodiments of this invention, the drinking straw is bendable and its length is a multiple of the circumference of the container lid or the depth of the container in which the straw will be used. Furthermore, its length (as enclosed circumferentially or horizontally in a channel enclosure or tube in its location on the container or lid) is a multiple of the circumference of the container or container lid as determined by the depth of the container in which the straw will be used. This configuration of the straw on the device in a circular, coiled, spiral, or angular manner would assure that the length of the straw would be sufficient to allow the straw to extend sufficiently beyond the ton of the container when the straw is in use. This functionality creates a container with a straw that is only as long as is necessary to be used comfortably, rather than awkwardly, by the end user. In other words, to be functional, the length of the straw in the current straw-containing device has to be a multiple of the depth of the container in which it is to be used. This is because the straw at its optimal, usable length is wrapped around the container horizontally in a ring-shaped, coiled (spiral), or angled manner to achieve the needed length—hence the circular, coiled or spiral shape of its enclosure on the container. This type of relationship between the container or lid and the straw is neither anticipated nor taught by prior art. The invention of the current device is not merely a rearrangement of existing art, but is an improvement on commercially available straw devices, and meets a need for a contemporary container and straw device that is functionally new. In the applications of this invention, the drinking straw is bendable and its length is a multiple of the circumference of the container lid or the depth of the container in which the straw will be used. In summary, the combination of features of the current device that are not similar to prior art or to other devices, and which teach new art from that currently on the market are:

- Completely removable straw that when removed from storage is intact and functional;
- Straw encased within a surface of, but not attached to or mounted on, the device;
- The construction of the straw-containing device is modified to accommodate the straw;
- The length of the straw is a multiple of the circumference of the container lid or the depth of the container in which the straw will be used
- The entire device is stable, and not subject to failure due to heat or moisture;
- The straw of the device is securely enclosed, and not subject to separation during transport;
- The device is easily packaged using conventional package industry practices and Standards;
- The device is suitable as replacement parts, with similar parts being interchangeable;
- The straw of the current device can be removed, and reused multiple times;
- The straw in storage in the current device can be kept sanitary before use;
- The structurally integral device and all of its parts are washable after use;
- The integral, unitary device and all of its parts, depending upon the material used for manufacture, is suitable for multiple uses;
- With the use of reusable materials (natural and manmade), the integral, unitary device supports the contemporary movement of creating a more sustainable environment.

BRIEF SUMMARY OF THE INVENTION

The present invention includes a reusable, unitary beverage straw-containing device comprising a bendable drinking straw removably encased by, or removably enclosed within, an interior or exterior surface of a beverage container, or removably enclosed within an interior or exterior surface of a beverage container lid. In its storage position, the straw is generally ring-shaped, coiled (spiral-shaped), or angled within a channel of the beverage container, or is generally ring-shaped, coiled, or angled within a tube called a channel enclosure of the beverage container or lid. Included herein, then, is a unitary, reusable and integrally-constructed beverage straw-containing device, including:

(a) a generally circular-shaped beverage container lid;
(b) a beverage container lid; and
(c) a bendable, removable drinking straw. The straw is removably enclosed within a tube or channel enclosure constructed within the beverage container lid. In its storage position, the drinking straw is generally ring-shaped, coiled, or angled, and its length is a multiple of the container in which the straw will be used.

Also included herein is a unitary, reusable and integrally-constructed beverage straw-containing device which includes:

(a) a beverage container, preferably a drink cup; and
(c) a bendable, removable drinking straw removably encased in or removably enclosed within a base (with "base" defined as any side or face of a surface) of the beverage container.

Thirdly, the invention includes a beverage straw-containing device, comprising:

(a) a beverage container,
(b) a removable container lid or cap attachable to a bottom base or top base of the beverage container; and
(c) a bendable, removable straw removably enclosed in a generally ring-shaped, coiled, or angled manner within an interior or exterior surface of the beverage container lid/cap.

Advantages of the present invention include the following:
1) Separate inventories and packaging are unnecessary.
2) Reduces the amount of packaging and, therefore, the amount of storage and counter space currently used to house drinking containers, lids, and straws.
3) The amount of wrapping material is reduced, thereby reducing packaging costs and the amount of waste.
4) Furnishes a unique, tactile, eye-catching experience for the often jaded fast food customer of any age, whether at home, school, work, or play. Current non culture emphasizes hand-eve coordination and exploration through the manipulation of hand-held devices. Therefore, the present invention expands upon this cultural phenomenon by placing the straw within a tube or enclosure for the user's experience of manipulating the straw from its storage position within the container. The present invention seeks, then, to provide a straw and container device that is functional, esthetically pleasing, easy to use, sanitary, and tactilely stimulating.

5) Provides an opportunity to display unusual straw designs and configurations for display and use, particularly for children.
6) Eliminates annoyance experienced by customers when a beverage is purchased but the straw is forgotten or misplaced.
7) Eliminates losses to business establishments from customers who help themselves to handfuls of straws for future use.
8) Sanitary packaging of the present invention ensures that proper hygiene is maintained in storage and in transit
9) For home, institutional or personal use, allows storage of the reusable beverage container or lid device with straw intact, which eliminates the problem of searching for a straw or having to purchase a separate package of straws.
10) The beverage container or lid device with straw is readily available when needed for travel or transit, since the device is unitary and integral, and, when needed, easily separated and removed for use.
11) The components of the reusable beverage container or lid device with straw are easily separated for cleaning.
12) The straw-containing device of the present invention can be engineered or adapted to fit any container or lid design, and a variety of materials used by the industry to manufacture beverage containers, lids, and straws.
13) When any component of the unitary device is lost or damaged, a replacement part could be purchased by the consumer.
14) As a reusable device suitable for cleaning and multiple uses, the device supports a sustainable environment.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
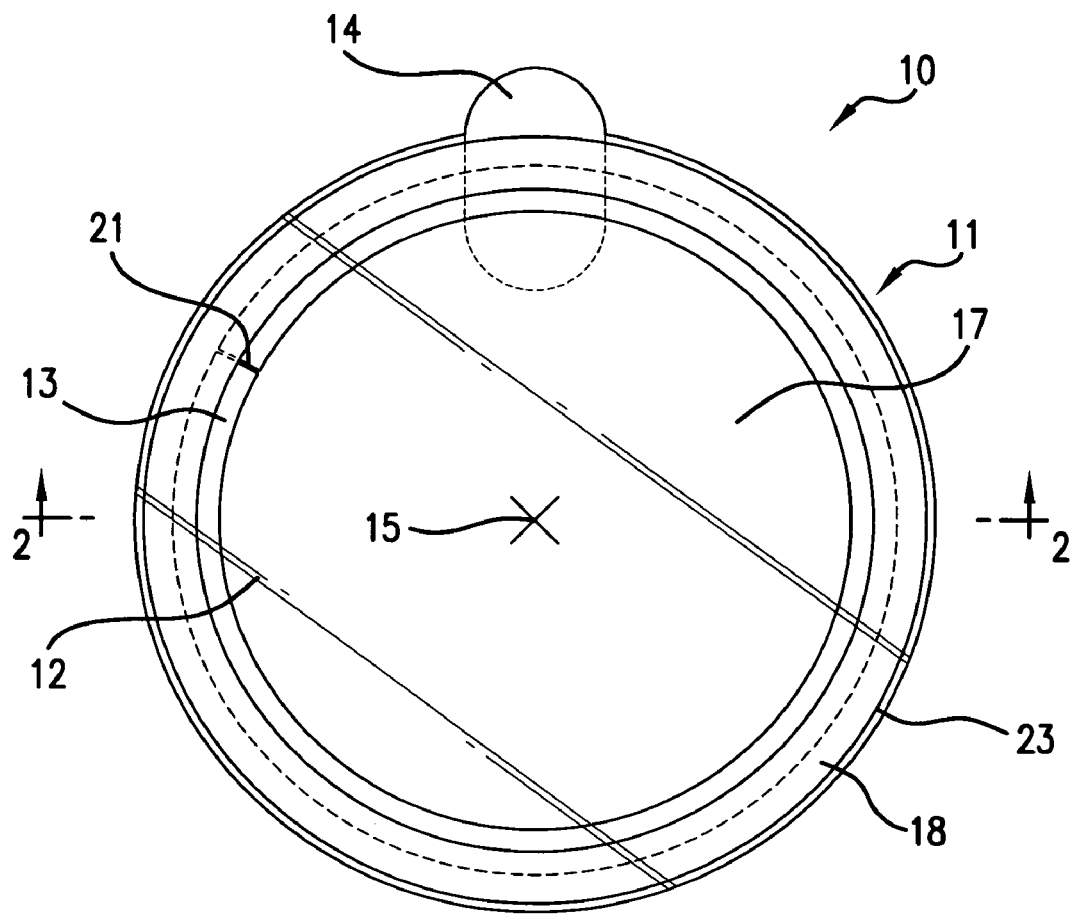
FIG. 1 is a top plan view of a beverage container lid and straw device according to the present invention.

In the following description, like reference characters designate like or corresponding parts throughout the several views. Also, in the following description, it is to be understood that such terms as "inside", "outside", "within", and the like are words of convenience and are not to be construed as limiting terms. Referring in more detail to the drawings, the invention will now be described.

A. Lid & Straw Device

Referring first to FIG. 1, the present invention is generally embodied in a unitary beverage container lid and drinking straw device, generally referred to herein as 10, which may be detachably affixed to any suitable beverage container. The suitable container is preferably a disposable or reusable cup 20 for holding a beverage, such as soda, water, juice, or coffee. The unitary beverage container lid and drinking straw device 10 includes a beverage container lid 11 with a generally circular periphery 23, a removable, disposable lid upper covering 12 on the container lid 11, and a generally-ringshaped or coiled, removable straw 13 sandwiched between the two. The disposable lid covering may be a peel-off covering. The drinking straw 13 is removably encased within, or directly or indirectly removably attached to, the beverage container lid 11 or upper covering 12, preferably by a suitable adhesive or the like. By "unitary" is meant that the straw/lid is basically one unit prior to detachment and use of the straw 13 and the lid 11. Since the drinking straw 13 is contained within or on the container lid 11, the straw 13 is "self-contained".

As also shown in FIG. 1, the lid covering 12 comprises a tab 14 along its periphery 23 by which the lid covering 12 is removed from the beverage container lid 11 just prior to use. The lid covering 12 is preferably made of an inexpensive, transparent or opaque, disposable film that conforms to the container lid 11. The lid covering 12 preferably extends across the top of the lid 11 and is pressed down around the periphery of the lid, as by pressurized sealing or any other suitable method. The lid covering 12 is preferably secured to the lid with an adhesive.

The beverage container lid 11 comprises a pre-formed straw aperture 15, preferably a central slit into which the user may insert the drinking straw 13 once the user has detached the straw 13 from the container lid 11. These beverage container lid and straw devices 10 are stackable for shipping, storage, and convenient service.

Figure 2:
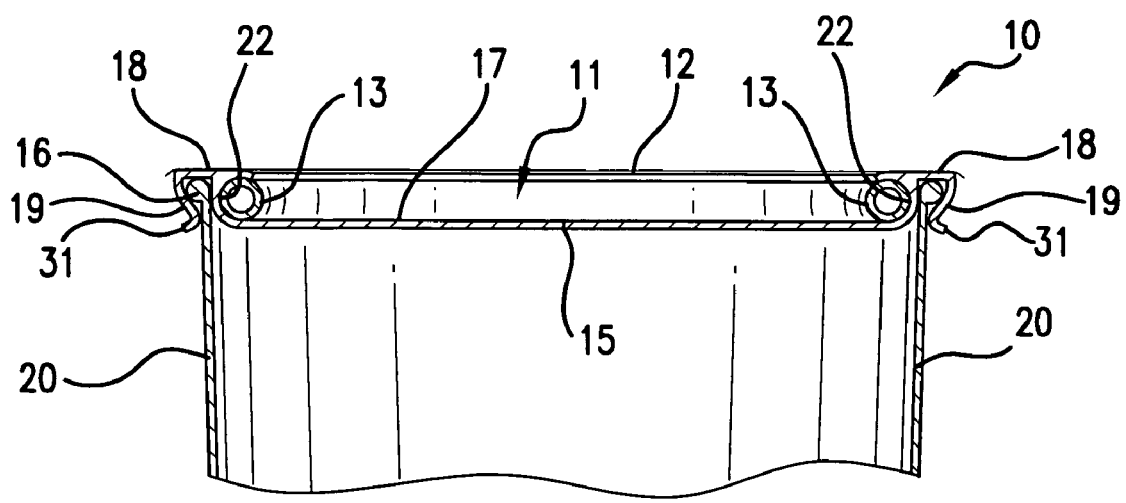
FIG. 2 is a cross-sectional view of the beverage container lid and straw device according to FIG. 1, taken across line 2-2.

Referring to FIG. 2, the beverage container lid 11 is preferably molded into a general disk-shape with a central, depressed area 17, and a ring-shaped, raised area 18 with a generally circular, annular outer rim 19. The raised area 18 and outer rim 19 are shaped to fit over and clasp the lip 16 of a beverage container 20, as seen in FIG. 2, so as to secure the lid 11 to the beverage container 20. The outer side of the straw 13, which has been conformed to a generally circular shape, is fitted against the inner wall 22 of the raised area 18 of the container lid. The straw 13 is partly held in place by the lid covering 12. The plane of the generally horizontally extending raised area 18 is a few millimeters above the plane of the generally horizontally extending central, depressed area 17.

The beverage container lid and straw device 10 is preferably made of a paper, resin, or plastic product, more preferably a pliable material capable of being formed into a particular curvature by the user for use or storage. The generally ring-shaped or coiled straw 13, for example, pushes against the inner wall 22 of the raised lid area 18 and is thus retained on the container lid 11.

To use the lid/straw device 10, the user lifts the pull-off tab 14, a rear portion of which remains attached to the lid, thereby exposing the straw 13. The user pulls the drinking straw 13 off the container lid 11, and shapes the straw, so that it is no longer in a ring-shape. The user then places the container lid 11 on the beverage container, inserts a lower end 21 of the straw into the slit 15 or other aperture in the container lid 11, and drinks through the straw 13. The user can dislodge the straw from the lid 111 either before or after the lid is placed on the beverage container. The ends 21 of the straw 13 may be adhered to one another and then separated in order to use the straw.

Figure 3:
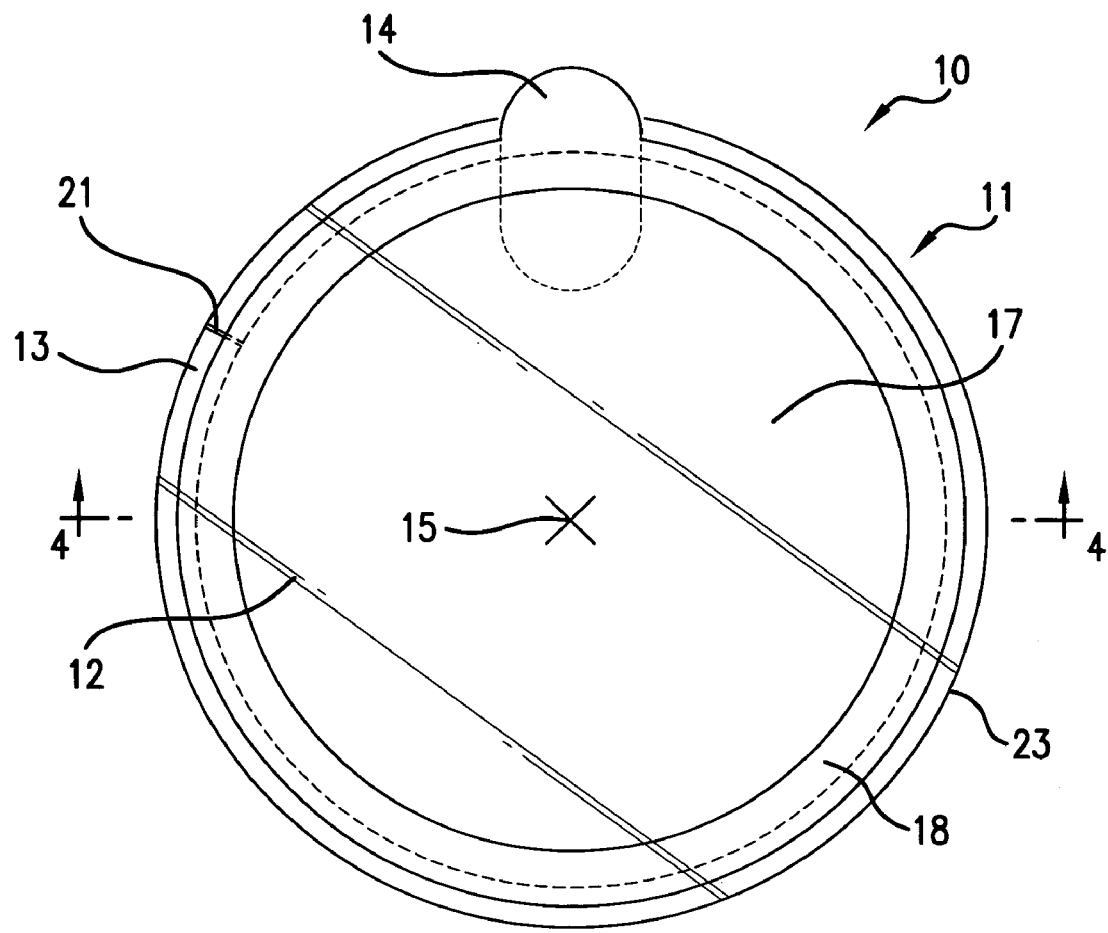
FIG. 3 is a top plan view of a beverage container lid and straw device according to the present invention.
Figure 4:
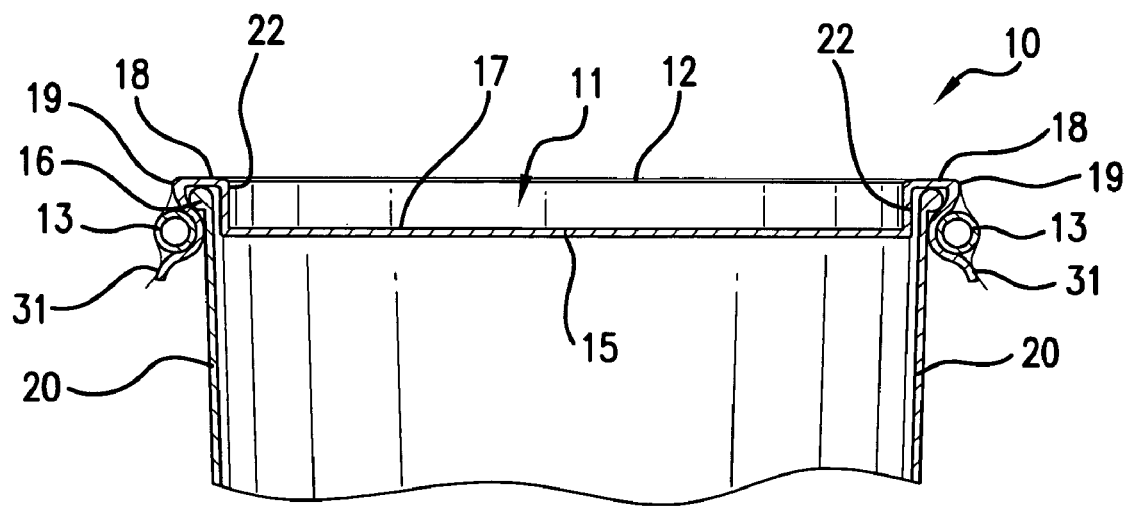
FIG. 4 is a cross-sectional view of the beverage container lid and straw device according to FIG. 3, taken across line 4-4.

Turning to FIGS. 3 and 4, a beverage container lid and straw device 10 comprises a beverage container lid 11 as described above. Here, though, the removable, ring-shaped straw 13 is directly or indirectly adhered to the outside of the outer rim 19 of the lid 11 by a suitable, safe adhesive. The lid outer rim 19 wall is preferably concave, as seen in FIG. 4. This concavity has been found herein to both accommodate the straw 13 and hug the lip 16 of the cup in order to facilitate retention of the lid 11 on the cup. The inner wall 22 of the raised lid area 18 is preferably at approximately a right angle to the central depressed lid area 17, as shown in FIG. 4. Thus, the raised lid area 18 and inner wall 22 of the lid also hug the lip 16 of the cup in order to facilitate retention of the lid 11 on the cup. The lid covering 12 may extend across the top of the lid 11, as shown in FIGS. 3 and 4, and down across the top of the straw, which substantially encircles the lid. The lid covering 12 may be sealed to the tip 31 of the outer rim 19 of the lid by a suitable adhesive, as seen in FIG. 4. The optional lid covering 12 serves to protect the lid and straw device 10, and to help retain the straw 13 on the lid 11 until use. The right angle tends to prevent the drinking straw 13 from sliding up and popping off the container lid 11. The generally vertically extending inner wall of the outer rim 19 of the lid preferably forms an acute angle with the inside wall of the raised area 18, as seen in FIG. 2. It has been found herein that this acute angle is advantageous for retaining the ring-shaped straw on the lid 11.

Figure 5:
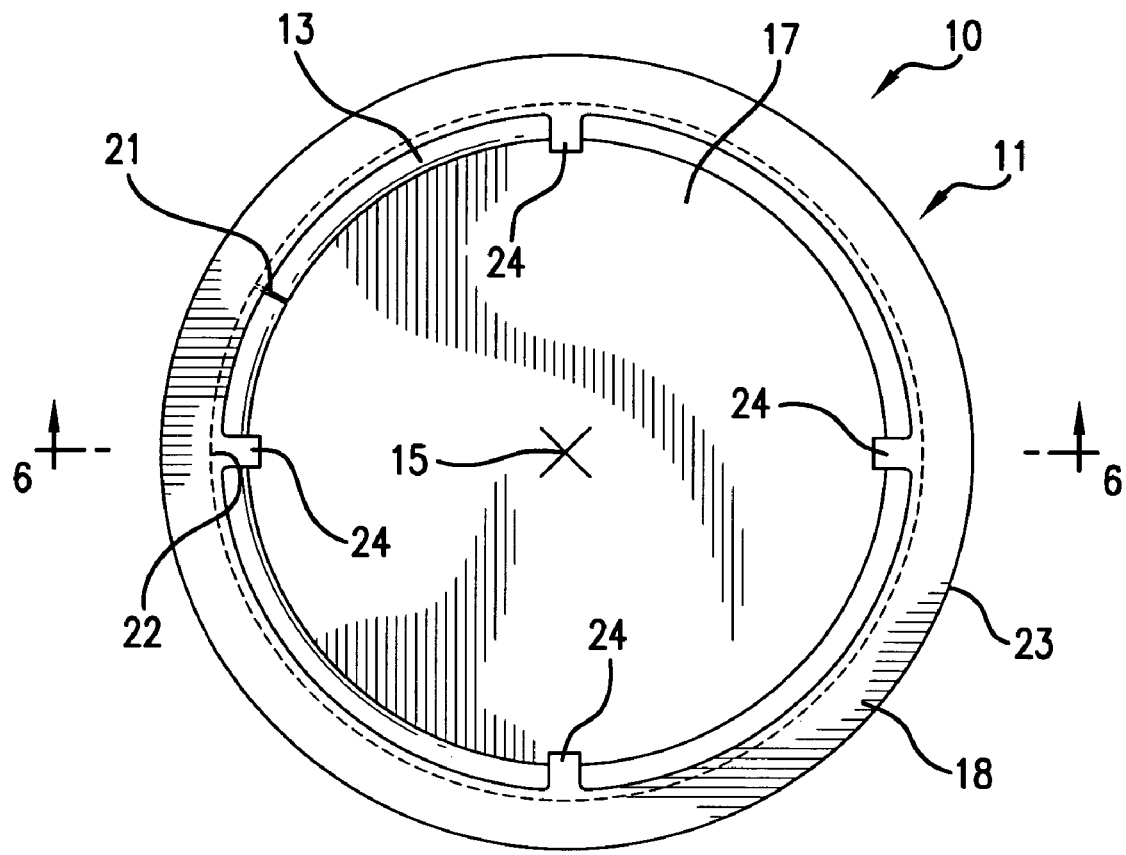
FIG. 5 is a bottom plan view of a beverage container lid and straw device according to the present invention.
Figure 6:
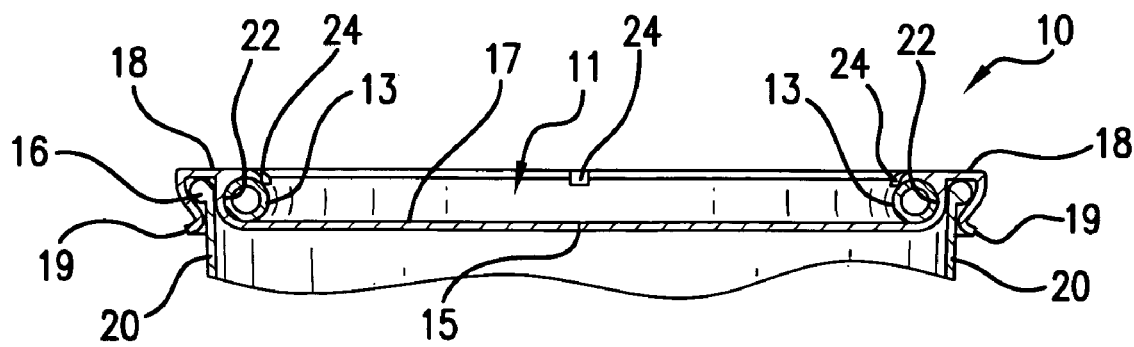
FIG. 6 is a cross-sectional view of the beverage container lid and straw device according to FIG. 5, taken across line 6-6.

Referring to FIGS. 5 and 6, a beverage container lid and straw device 10 comprises a drinking straw 13, which is held under spaced apart flaps 24 extending out from the raised area of the lid 11. The side of the stored, ring-shaped straw is against the wall 22 of the lid, and the bottom of the ring-shaped straw 13 rests on the central depressed, area 17 of the lid. The straw flaps 24 and the outward pressure of the curved straw against the circular wall 22 of the lid contain the straw. No adhesive is required to maintain the straw 13 on the container lid 11. The straw 13 can easily be pulled away from under the straw flaps 24 by the user.

The straw flaps 24 depicted in FIGS. 5 and 6 extend laterally from the raised area 18 of the lid and can be made from the same material as the lid. The straw flaps 24 are somewhat flexible, so the ring-shaped straw 13 can be placed under the straw flap 24 during manufacture, as shown in FIG. 6. Four flaps 24 are shown in FIG. 5. Any number of straw flaps 24 may be utilized. They are spaced apart at intervals on the lid. Alternatively, the straw flap 24 extends as a continuous ledge or sheath around the lid from the raised lid area 18.

In the various embodiments of the present invention, the container lid/straw device 10 can be made more appealing through the use of novel colors or designs on the container, lid, or straw. Streamers, letters, numbers, and/or characters can be placed on the straw, container, or lid for juvenile interest.

Figure 7:
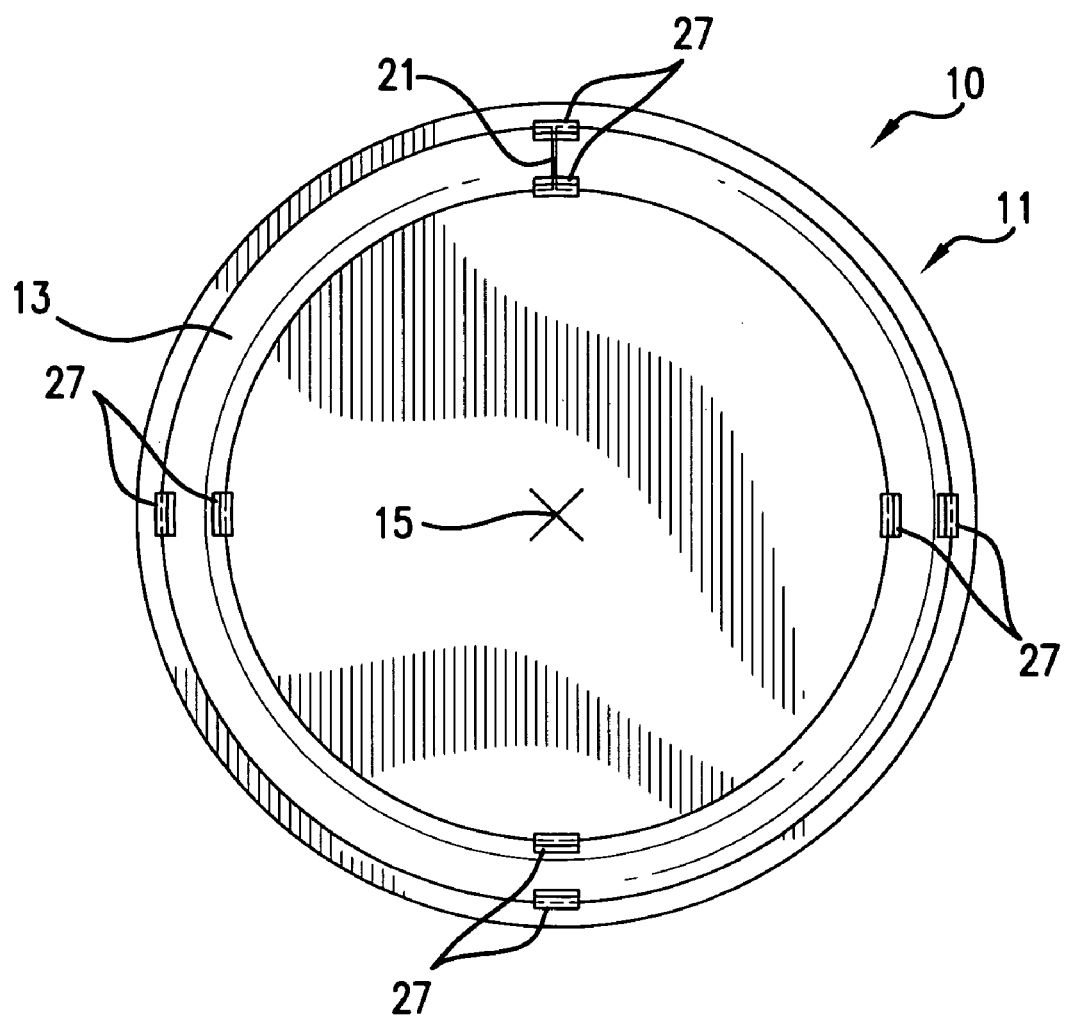
FIG. 7 is a top plan view of a beverage container lid and straw device according to the present invention.
Figure 8:
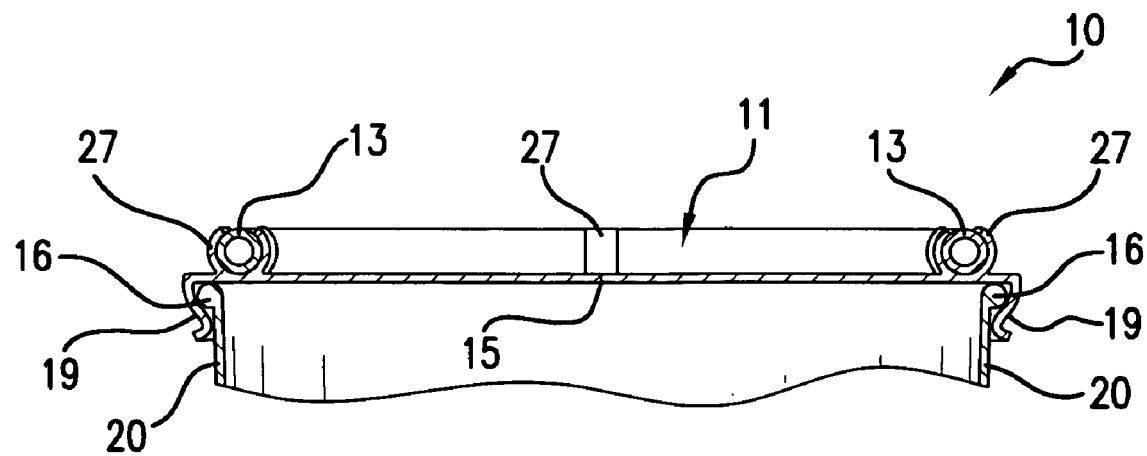
FIG. 8 is an alternate cross-sectional view of the beverage container lid and straw device according to the present invention.

As shown in FIGS. 7 and 8, at least two small clips 27, or holders, of a flexible material (or of the lid material) project upwardly from the container lid 11 to hold the ring-shaped or coiled drinking straw 13 on top of the lid 11. The distance between the two clip portions of a set of straw clips 27 is about equal to the outside diameter of the straw 13, so the straw is held closely by each straw clip 27. The base of the clip portions is attached to, or extends up from, the generally planar exterior surface of the lid. The clips are preferably arranged close to the periphery of the lid in a circle on the lid 11 for holding the ring-shaped straw 13. When the straw 13 is in storage position on the lid, the sides of the ring-shaped straw 13 contact the insides of the clip portions 27, and the base of the straw rests on the generally planar top of the lid. The straw clips 27 are spaced apart on the lid 11. Four sets of clips 27 are shown in FIG. 7, but any suitable number may be used. For example, additional straw clips 27 for longer straws 13 are strategically arranged so that the coiled straw is securely held in place. The lid outer rim 19 hugs the lip 16 of the cup and facilitates retention of the lid 11 on the cup.

Where the drinking straw 13 of the lid/straw device 10 is reusable, it is easy to remove from the container lid 11 for use and then, once it is clean, for reattachment to the container lid 11. Alternatively, a replacement straw 13 can be clipped into the straw clips 27, where the beverage container 20 and lid 11 are reusable and have been cleaned. Because the current device is unitary, yet separable, and suitable for multiple uses unlike prior inventions for combining cups with straw devices, the current invention anticipates a system of functional replacement parts. The present invention is an improvement in functionality in this regard. The consumer may purchase as a replacement part either the straw or the container or lid. This feature allows the additional functionality of mixing and matching contrasting colors, as the consumer desires for theme parties, for matching decorations/décor for identification of ownership (e.g., in homes or offices with multiple users), or for whimsy.

Figure 9:
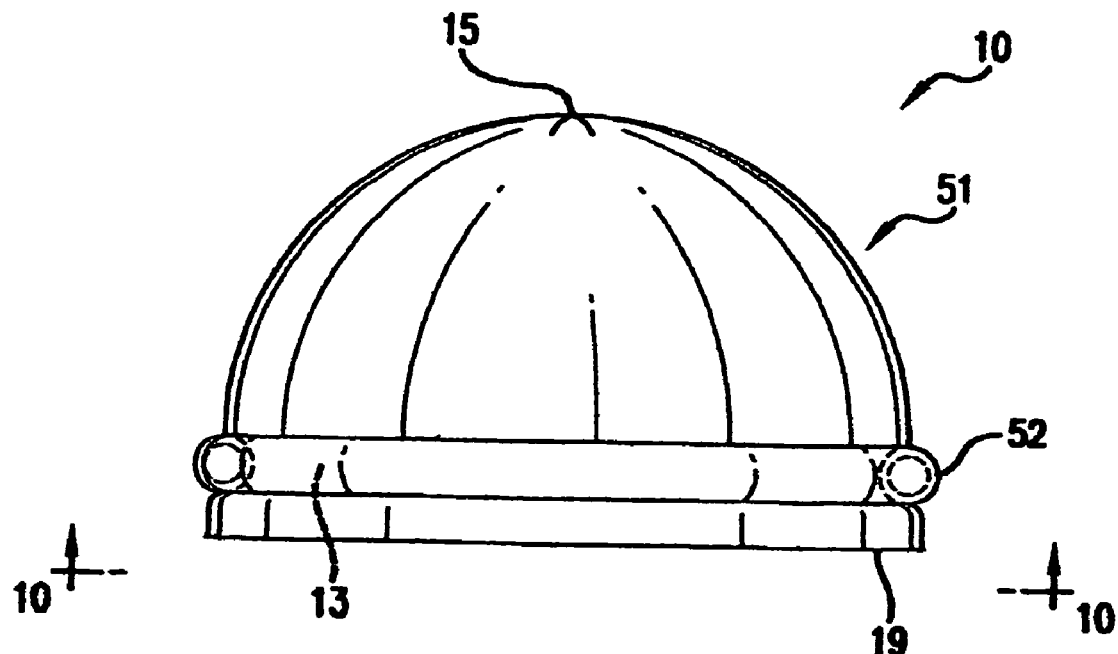
FIG. 9 is a side elevational view of a beverage lid and straw device according to the present invention, showing a domed lid.
Figure 10:
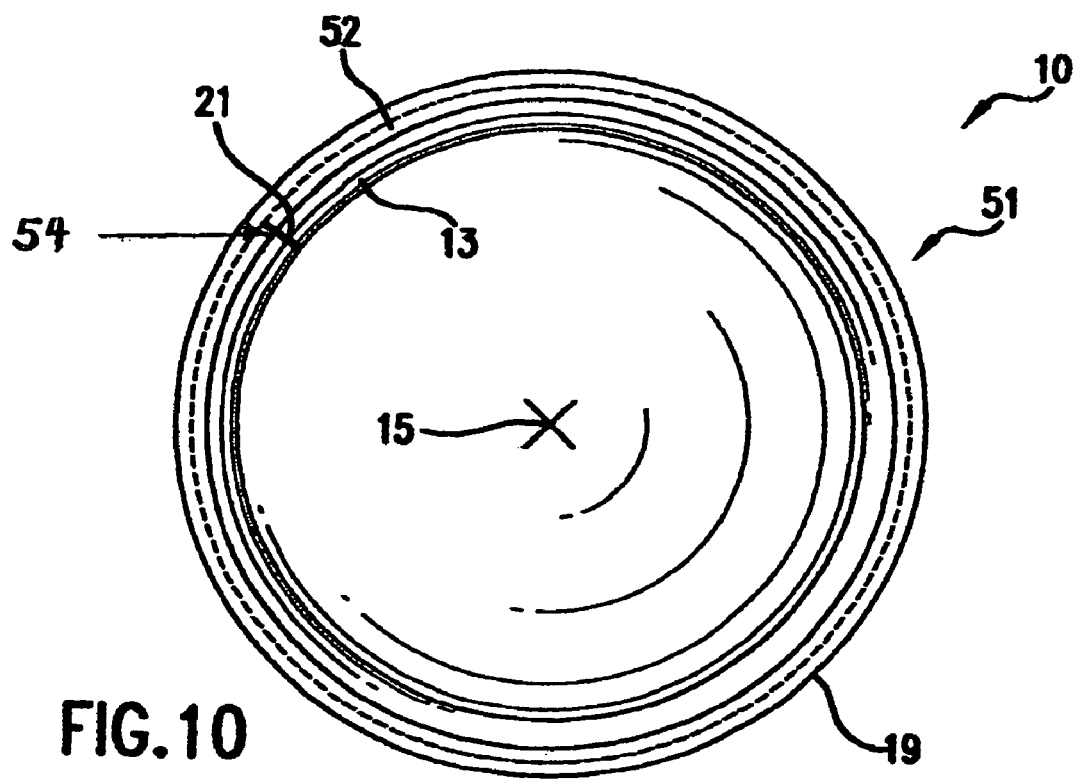
FIG. 10 is a bottom plan view of the container lid and straw device according to FIG. 9.

Turning to FIGS. 9 and 10, a beverage container lid and straw device 10 includes a drinking straw 13 in storage within a hollow tube called a channel enclosure 52 which encircles a domed lid/cap 51. A domed lid/cap 51 is useful for hot or cold drinks with a head of foam, such as specialty coffees, slushes, or milkshakes with whipped cream on top. Of course, the dome accommodates the head of foam or cream, which would otherwise be compressed by a flat lid. The domed lid/cap 51 may include a slit 15 at the top for accommodating the uncurled straw once the straw has been removed from its storage position in the domed lid/cap 51. In FIG. 9, it can be seen readily that the bent, generally ring-shaped drinking straw 13 has two open ends. Furthermore, the straw in FIG. 9 is removably encased within the channel enclosure 52 that extends around a periphery of the container lid, as also is the case with FIGS. 11, 22-25. The channel enclosure 52 is integrally formed, preferably, of the same material, preferably plastic, as the container lid/cap 51. However, the channel enclosure 52 may or may not be made of the same material as the container lid/cap. It can be seen also in FIG. 9 that the channel enclosure 52 is formed into a hollow circle or concavity slightly larger than the encased drinking straw 13. The channel enclosure 52 with its encased drinking straw 13 is a closed tube formed by curving or bending one wall surface of the container lid over to another to form the tube/channel enclosure. FIG. 10 is a top view of the straw-containing device with a domed lid. FIG. 10 shows the end of the straw 21 and the channel opening 54 in the channel enclosure 52 where the straw can be extracted and, after use, replaced by the user. In both FIGS. 9 and 10, the drinking straw 13 alternatively may be removably encased within a straw wrapper 49 in its storage position within the channel enclosure 52 of the domed lid/cap 51. Alternatively, the generally ring-shaped straw 13 may be enclosed within a channel enclosure 52 in the domed lid 51, from which the straw can later be removed for use.

Figure 14:
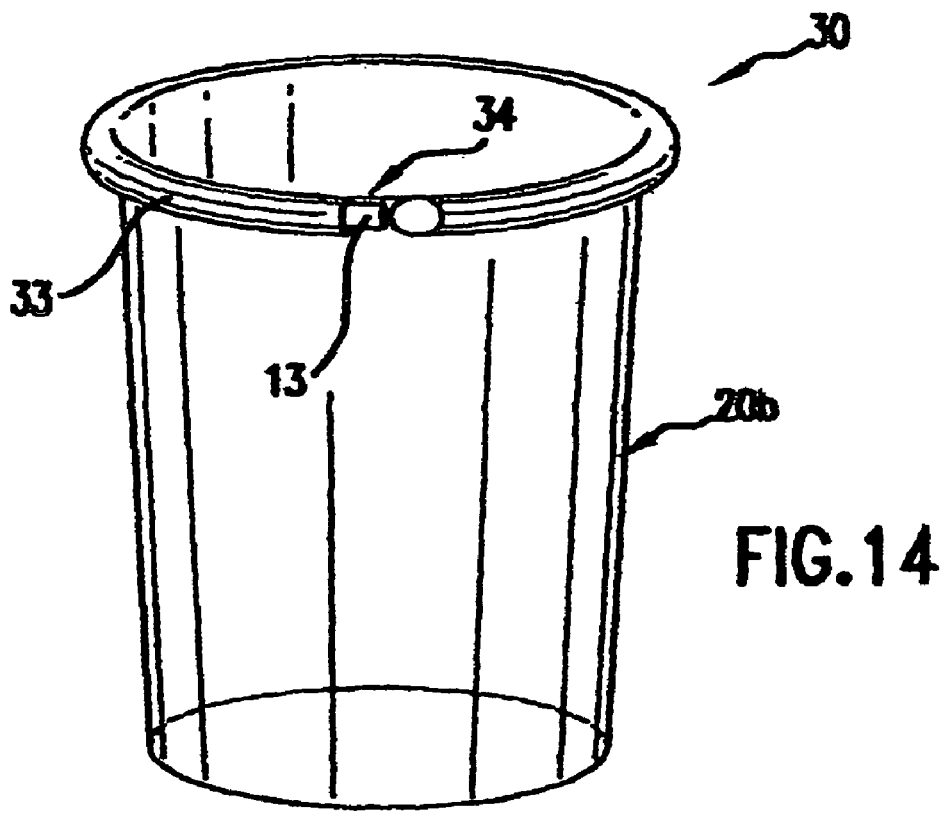
FIG. 14 is a perspective view of a beverage container and straw device according to the present invention, showing a channel enclosure.

The channel enclosure 52 in the domed lid/cap 51 may fully enclose the ring-shaped drinking straw 13, as shown in FIG. 10. provided there is at least one open end called a channel opening, 54 of the channel enclosure 52 that reveals one open end of the straw that is clearly shown in FIG. 14). Alternatively, the ring-shaped straw may simply be pressed into a straw channel 53 having an open side. In the former case, the new or cleaned, reusable straw 13 is threaded through the channel enclosure 52 in the lid. In the latter case, the new or cleaned and reused, flexible straw fits closely in the straw channel 53 from the inside of the domed lid 51. If the straw ends 21 do not meet, a tip of a user's finger can be inserted between the straw ends 21 to facilitate removal of the ring-shaped straw from the channel opening 54 prior to use.

Figure 11:
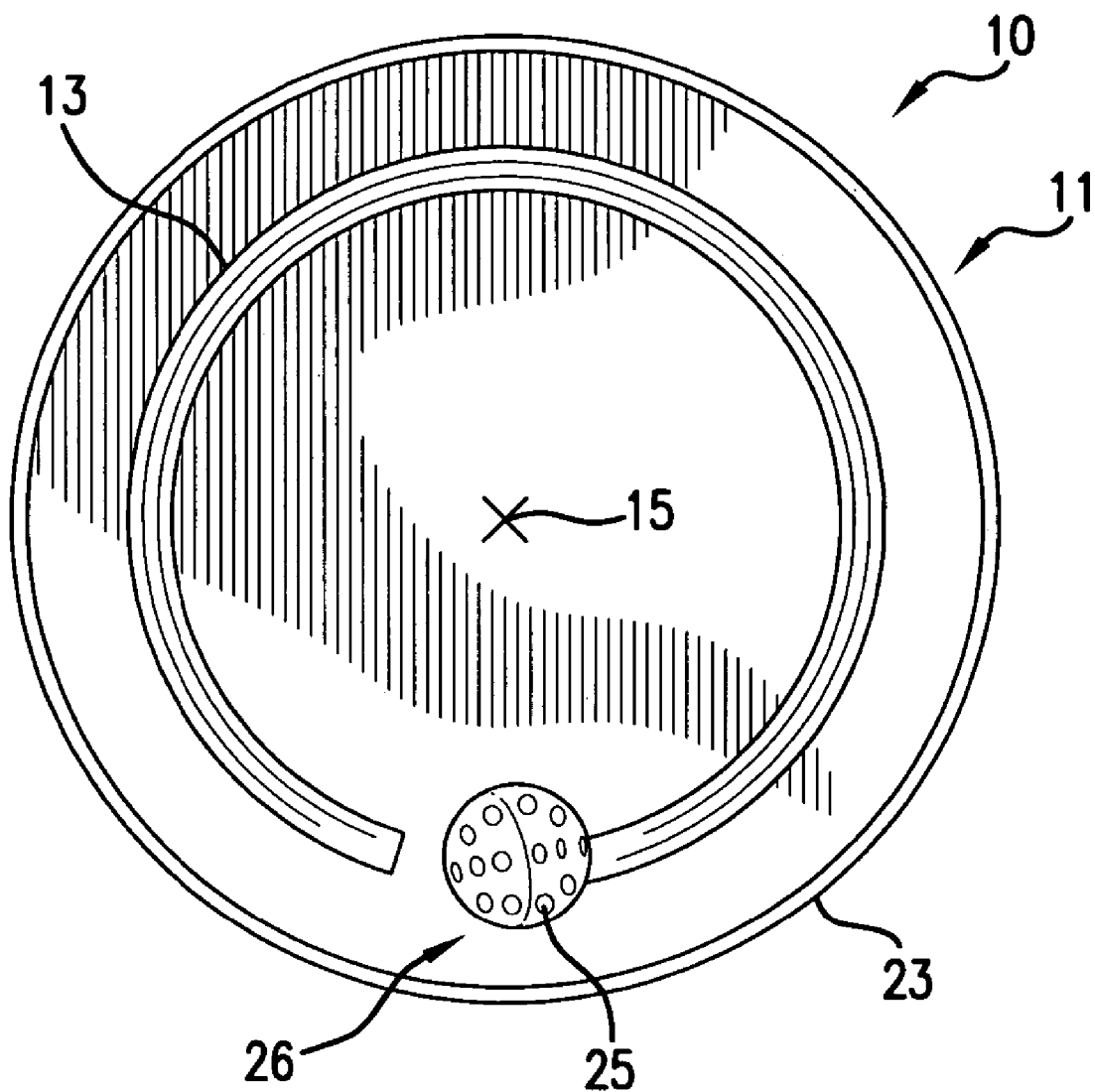
FIG. 11 is a top view of a beverage container lid and straw device according to the present invention, showing a globe-shaped straw.

As shown in FIG. 11, a container lid and straw device 10 includes a coiled straw 13. An upper end of the straw 13, which is preferably generally globe-shaped, comprises a number of small beverage apertures 26. The beverage can be sipped through the small beverage apertures 26 in the globe end 25. For storage on the container lid 11, the spiral, or coiled, straw 13 is detachably adhered using a suitable adhesive to the upper or lower surface of the container lid 11, or secured to the lid by other means described herein. To use the coiled straw 13, the user pulls it from the container lid 11, straightens it, fills the cup or other container with beverage, puts the container lid 11 on the container, and inserts the lower end 21 of the straw 13 through the lid slit 15 into the cup or other container. The user then puts his or her mouth over the hollow globe 25 on the upper end of the straw 13 and sips the beverage. The small beverage apertures 26 in the globe end 25 create a novel burst of liquid that is pleasing to the palate, especially for juvenile users.

Figure 12:
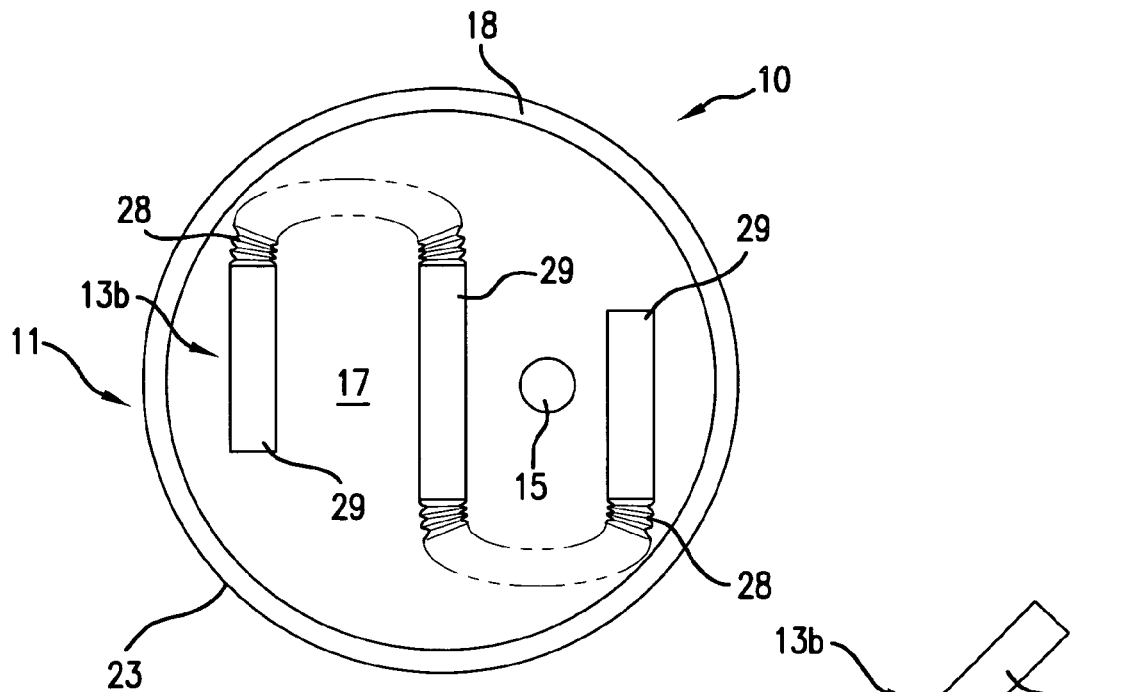
FIG. 12 is a top plan view of a beverage container lid and straw device according to the present invention.
Figure 13:
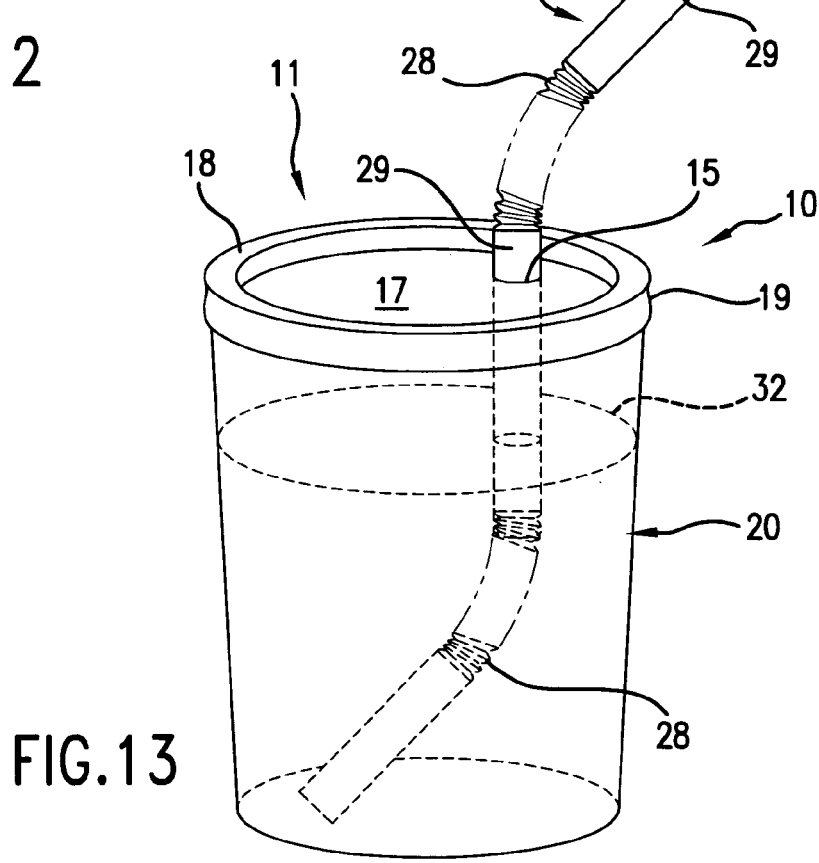
FIG. 13 is a perspective view of the beverage container lid and straw device according to FIG. 12, shown ready for use in a beverage cup.

Turning to FIGS. 12 and 13, the straw is shown displayed in an angular manner on the lid of the container and within the container for which it was designed. The straw of FIGS. 12 and 13 is a bendable, flexible straw 13 of a beverage straw-containing device that includes more than one accordion-pleated straw sections 28. As with the coiled or spiral straw, the accordion-pleated or angled straw allows a longer straw to be contained within the beverage container lid and straw device. Here, the beverage container lid and straw device 10 includes a straw 13b having two accordion-pleated, or flexible, straw sections 28 interspersed between three straight straw sections 29. The accordion-pleating allows the removable straw 13b to be bent into three side by side sections on the central, depressed portion 17 of the container lid 11, as shown in FIG. 12. Preferably, the straw 13b would be enclosed within a straw channel enclosure 52 that is constructed integrally within the central, depressed area of the lid 17. Each accordion-pleated section 28 has a length that is substantially less than the diameter of the container's lid 11, so that the straw 13b fits neatly on the lid. It has been found herein that if the central, depressed lid area 17 is depressed an amount approximately equal to the diameter of the straw or a channel enclosure, the raised lid area 18 protects the straw 13b when/if the straw-containing devices are stacked on one another for storage. The container lid and straw device 10 is stackable for convenient shipping, storage, and service.

As shown in FIGS. 12 and 13, the straw/lid device 10 includes a round straw aperture 15 for accommodating the straw 13b once it is unfurled. The straw aperture 15 is preferably off-center so that it does not interfere with attachment of the bent straw 13b on the lid 11. The straw aperture 15 can alternatively be centered on the lid. The attached straw 13b may optionally be enclosed in a clear cellophane wrapper for added cleanliness. The individual lid/straw devices 10 may also be enclosed in wrappers during storage, if desired.

Once the bent straw 13b is detached from, or removed from the channel enclosure or tube of, the container lid 11, the container lid 11 is placed on the filled beverage container 20 and the straw 13b is unfolded sufficiently to insert it into the straw hole 15 in the container lid 11. FIG. 13 shows the straw of FIG. 12 in use (mouth of user not shown), as a device of two-piece construction. In FIG. 13, a lower portion of the unfolded straw 13b is shown extending into a beverage 32 in a partially-filled cup or other beverage container 20. The straw 13b need not be completely straightened in order to be used with the unitary, integrally-constructed container for which the straw is designed.

Alternatively, the drinking straw 13b can be held in place prior to use by straw flaps 24, straw clips 27, a channel, or a channel enclosure 52, as described hereinabove, on the upper or lower surface of the container lid 11. The straw 13b is preferably made of pliable paper, clear plastic, vinyl, or a suitable material that can assume the form of a ring or angled for packaging. The straws 13, 13b herein can be substantially straightened out by a user just prior to use. In use, the straws 13, 13b direct the flow of the beverage from the container to the user's mouth.

B. Container & Straw Device

Figure 27:
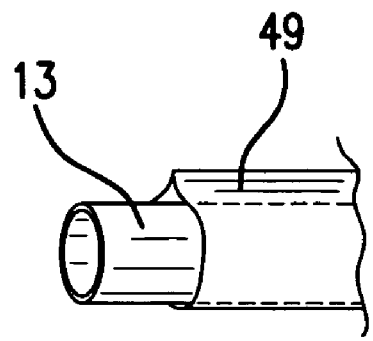
FIG. 27 is an expanded perspective view of a portion of a straw of a straw-containing device according to the present invention.

Turning now to FIG. 14, a beverage container and straw device 30 herein includes a drinking straw 13 that is substantially enclosed within a channel enclosure 33 on the outside of the lip of the beverage cup 20b. The (lip) channel enclosure 33 extends around the upper circumference of the container, and is integrally formed of the same plastic, material, preferably as the container. It can also be seen in FIG. 14 that the length of the channel enclosure 33 is longer than the length of the encased drinking straw 13, and is molded or fused into a hollow circle or concavity slightly larger than the encased drinking straw 13. The channel enclosure 33 with its encased drinking straw 13 is constructed by fusing or molding one inside wall surface of the container to the outside wall surface to form a hollow concavity. The drinking straw 13 has only one end showing, and can be removed for use by pulling it through the single small gap, or opening 34 in the lip channel enclosure 33 for insertion and removal of the drinking straw, as depicted in FIG. 14. Also depicted in FIG. 14 is the second end of the lip channel enclosure 33 that is closed, When the drinking straw 13 is enclosed in this storage position within the lip channel enclosure 33 of the beverage cup 20b or other container, an exposed straw end (e.g., about one centimeter) is available for the user to grasp. The user then pulls the rest of the drinking straw 13 out of the lip channel enclosure 33, and inserts the straw in the drink. The drinking straw 13 is protected by and kept sanitary in the lip channel enclosure 33. This container/straw device 30 is preferably used with a cup lid, though it need not be. The reusable or disposable container/straw devices 30 are stackable for convenient shipping and storage. An optional, form fitted transparent film over the small, exposed straw end portion may be included for further protection, or the straw may be encased within a straw wrapper 49 as shown in FIG. 27, if desired.

Figure 15:
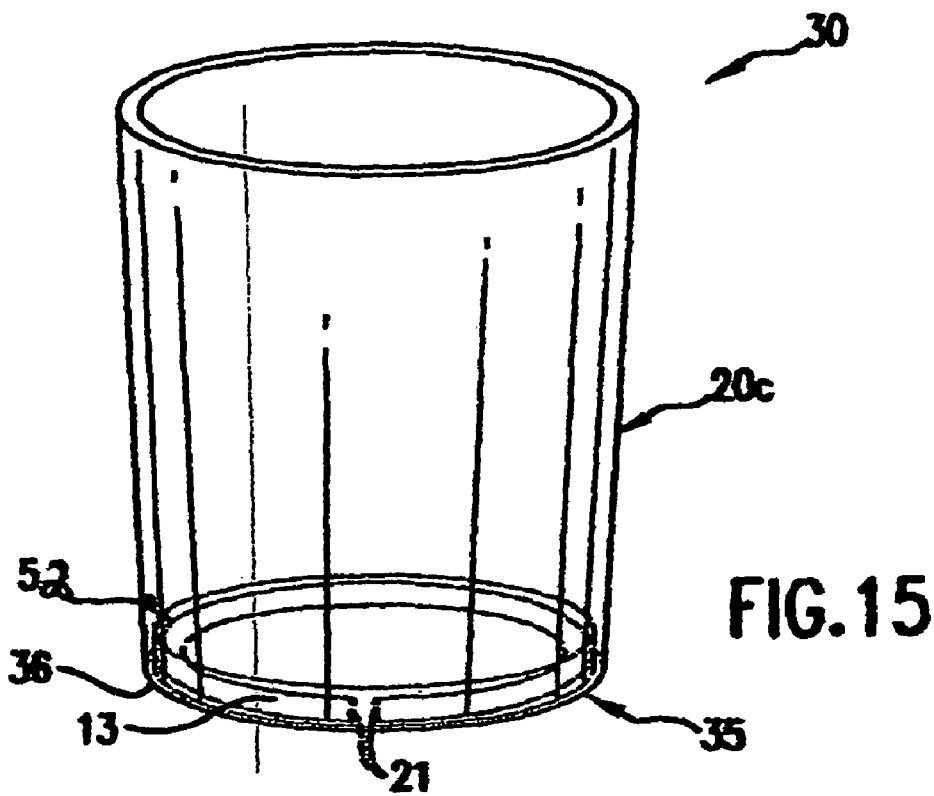
FIG. 15 is a perspective view of a beverage container and straw device according to the present invention, showing a base channel enclosure.

Turning to FIG. 15, a beverage container and straw device 30 includes a generally ring-shaped, flexible straw 13 enclosed within a surface of the container, more specifically the bottom base 35 of the reusable beverage cup 20c. The beverage cup base 35, alternatively could include a straw channel 53 having open sides adjacent the bottom lip 36 of the container for holding the straw 13 in the storage position. In FIG. 15, it can be seen that the length of the channel enclosure 52 is longer than the encased straw 13. To remove the reusable straw 13 from its storage position, the beverage cup 20c may be turned upside down and the ring-shaped straw 13 may simply be grasped with the finger, pulled, and completely removed from the opening of the channel enclosure 52. After use and cleaning, the beverage cup 20c would be turned upside down again, and the cleaned ring-shape straw 13 would be threaded back into its ring-shaped position within the channel enclosure 52. Where the beverage cup 20c is constructed with a straw channel 53 (with open sides rather than open ends), after use and cleaning, the beverage cup may be turned upside down, and the cleaned, ring-shaped straw 13 may simply be pressed into the opening of the straw channel 53. If the opening to the channel enclosure 52 or straw channel 53 is on the outside surface of the bottom base, the straw 13 is accessed with the cup 20c in its upright position. The diameter of the channel enclosure 52/straw channel 53 is only slightly larger than the diameter of the drinking straw 13, so the straw fits closely in the channel enclosure 52/straw channel 53.

The length of the straw 13 is preferably slightly longer than the length of the generally circular channel enclosure 52/straw channel 53. However, if there is a gap between the straw ends 21, as shown in FIG. 15, a tip of a user's finger can be inserted between the straw ends 21 and the gap in the longer straw channel enclosure 52, 53 to facilitate removal of the ring-shaped straw from the channel 52, 53 prior to use. Once it has been removed, the straw 13 can be pulled generally straight and inserted in the beverage (not shown) in the beverage container 20c. The containers/straw devices 30 are stackable. The base 35 with the straw 13 may be covered by a film or lower covering for enhanced cleanliness or the straw may be covered by a straw wrapper 49, as shown in FIG. 27.

Figure 16:
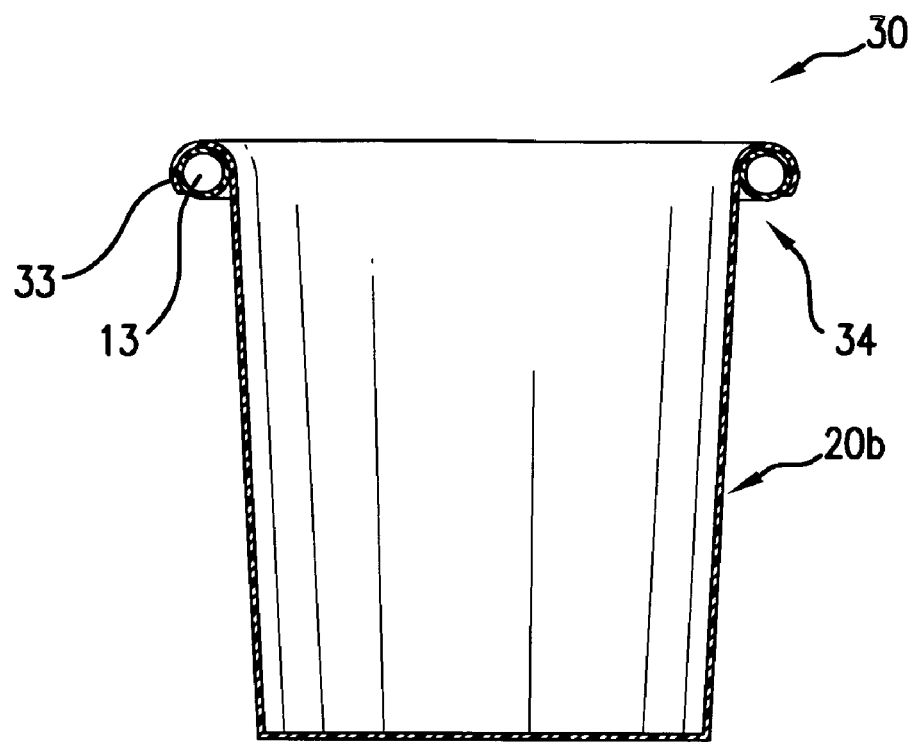
FIG. 16 is a cross-sectional view of a beverage container and straw device according to the present invention, shown with a partially open channel.

Turning to FIG. 16, a beverage container and straw device 30 includes a disposable or reusable cup 20b with the lip around the top of the container extending out to form a lip channel enclosure 33 for containing the ring-shaped straw 13. Here, the channel opening 34 is across the bottom side of the generally circular lip channel enclosure 33. The channel opening 34 is large enough for the straw 13 to be easily inserted in and removed from the lip channel enclosure 33. The flexible straw 13 has a diameter that is slightly smaller than the diameter of the lip channel enclosure 33, so the straw fits closely in the lip channel enclosure 33 when it is in the storage position as shown in FIG. 16. The length of the straw 13 is preferably slightly shorter than the length of the circular lip channel enclosure 33.

Figure 17:
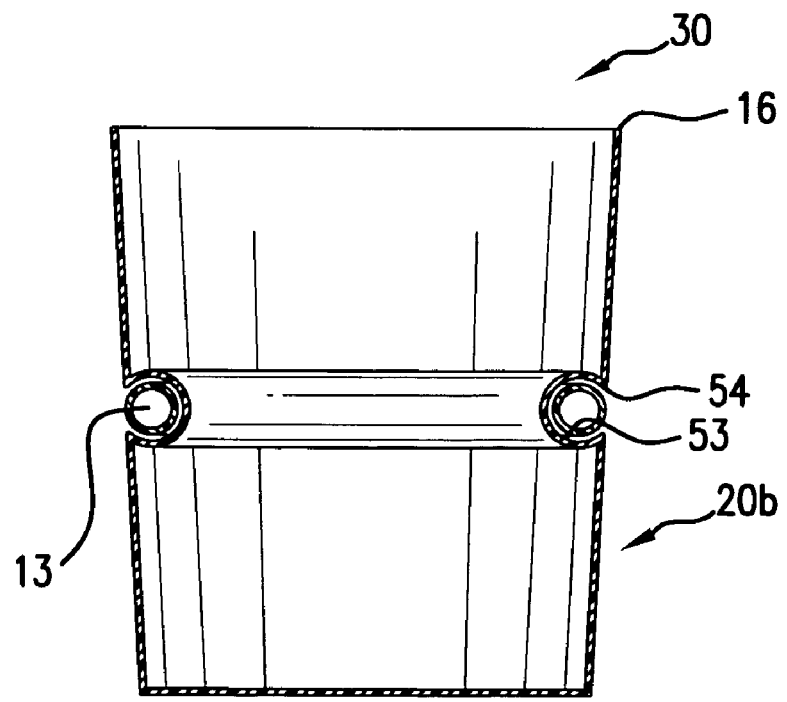
FIG. 17 is a cross-sectional view of a beverage container and straw device according to the present invention.

Turning to FIG. 17, a beverage container and straw device 30 includes a beverage cup 20b with a generally circular straw channel 53 built into the midsection of the cup. The straw channel 53 holds the ring-shaped straw 13 until it is ready for use. The straw channel 53, which encircles the cup, is generally parallel to the lip 16 of the cup 20b. The empty straw channel 53 does not interfere with the performance of the beverage cup 20b or the straw 13. The channel opening 54 to the side of the cup is large enough for the drinking straw 13 to be easily inserted in and removed from the channel 53. The flexible straw 13 has a diameter that is slightly smaller than the diameter of the channel 53, so the straw 13 fits closely in the curved channel 53 when the straw is in the storage position as shown in FIG. 17. The length of the straw 13 is preferably slightly shorter than the length of the circular channel 53.

Figure 18:
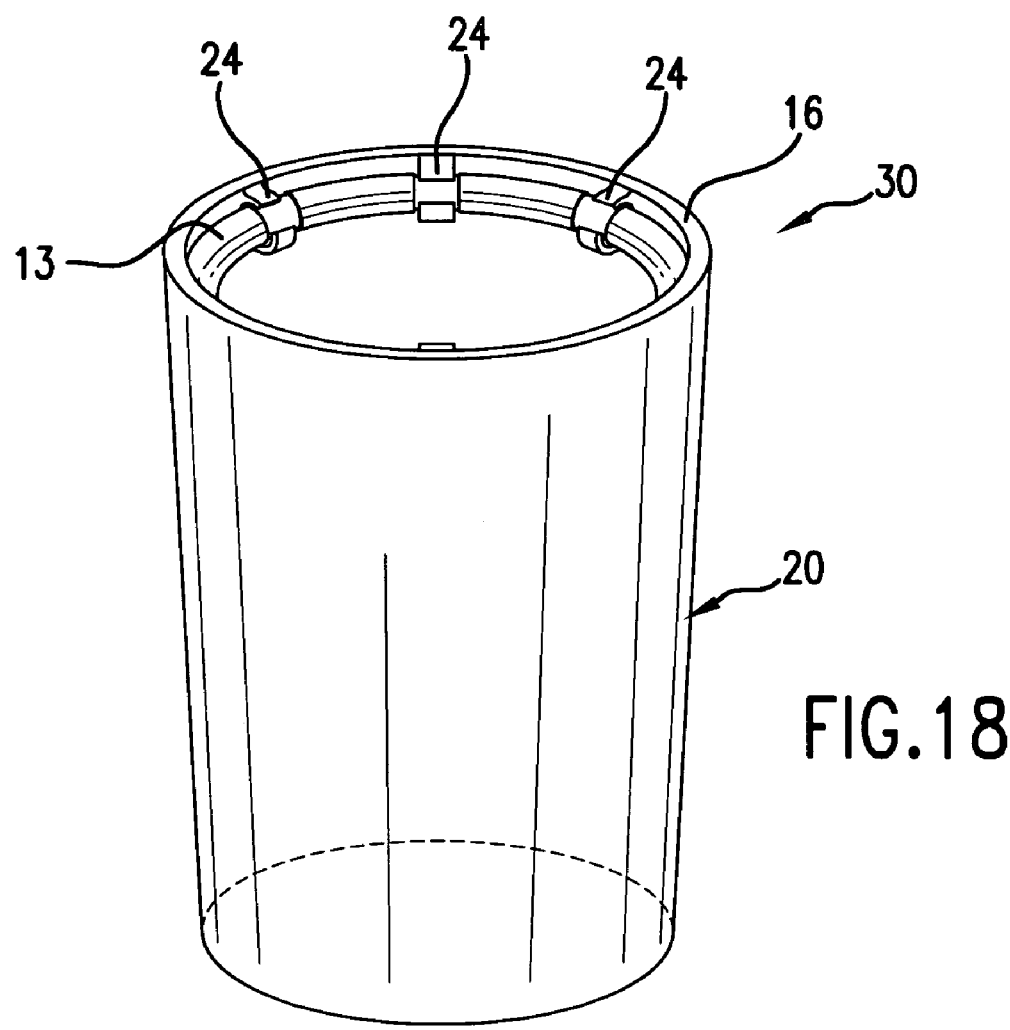
FIG. 18 is a perspective view of a beverage container and straw device according to the present invention.

Turning to FIG. 18, a beverage container and straw device 30 includes a ring-shaped drinking straw 13 that is suspended generally parallel to the lip 16 of the beverage container 20 on the inside wall of the container by a row of small, spaced apart straw closures, such as straw clips 27. The generally vertically positioned straw clips 27 form a channel through which the ring-shaped straw 13 is inserted when the straw is in a storage position. The rear ends of the small clips 27 are adhered to, or integral with, the interior wall of the beverage container 20 adjacent the lip 16 of the cup. To use the straw 13, the user pulls it out from the clips 27 or other closures. The beverage container is preferably a beverage cup.

Figure 19:
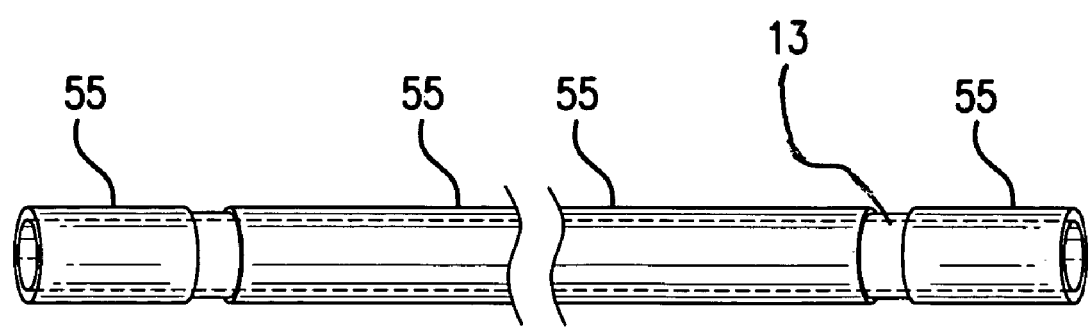
FIG. 19 is an expanded perspective view of a straw of the beverage container and straw device according to the present invention.

Alternatively, as illustrated in FIG. 19, the straw 13 may be removably encased within a protective sheath 55 that is preferably slightly shorter than the straw, so that the straw 13 can be inserted and removed with ease by the user. The stationary protective sheath is integral to the container, and is preferably made of the same material as the beverage container.

Figure 20:
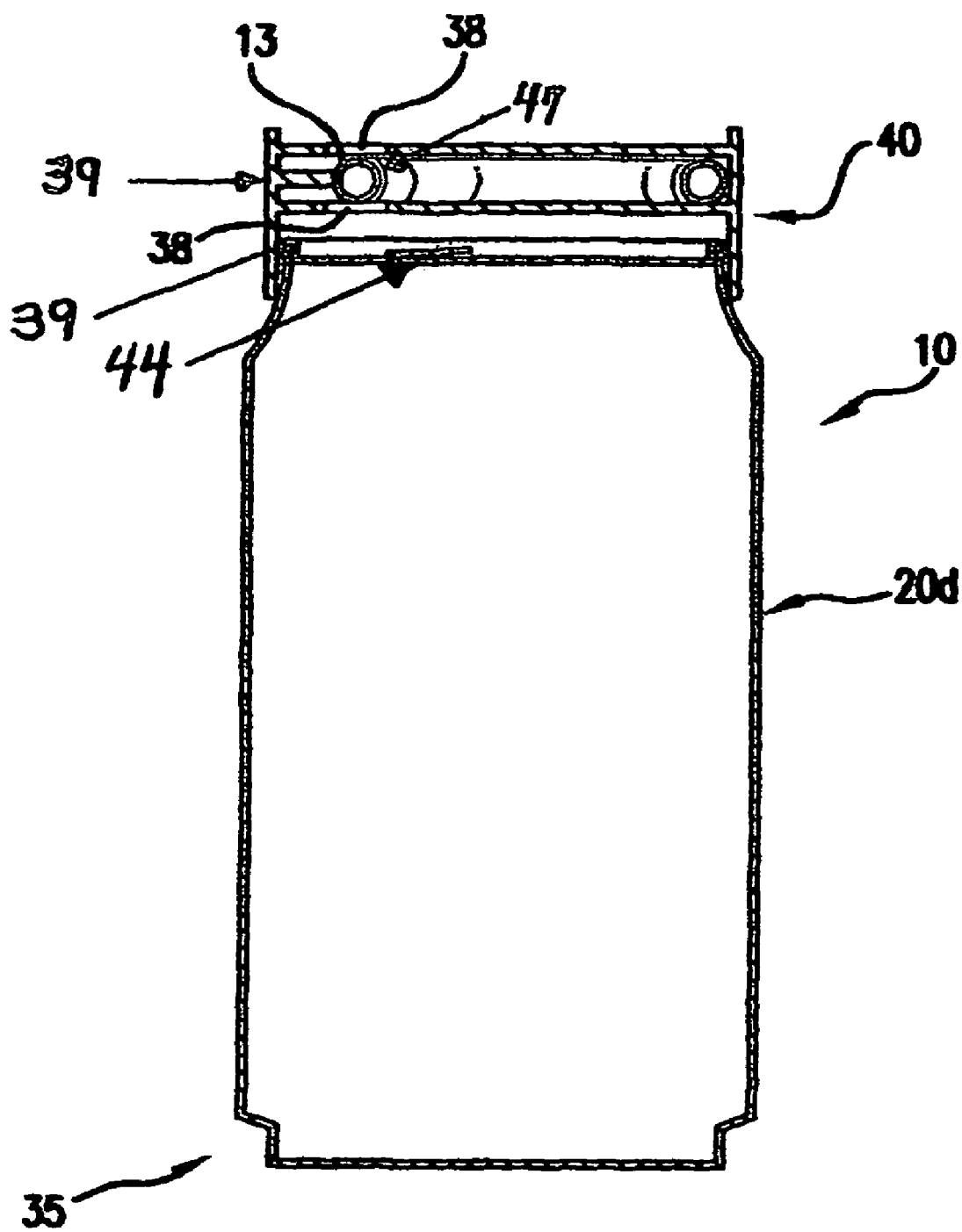
FIG. 20 is a cross-sectional view of a beverage can lid and straw device according to the present invention, showing a disk cap on top of the beverage can.
Figure 21:
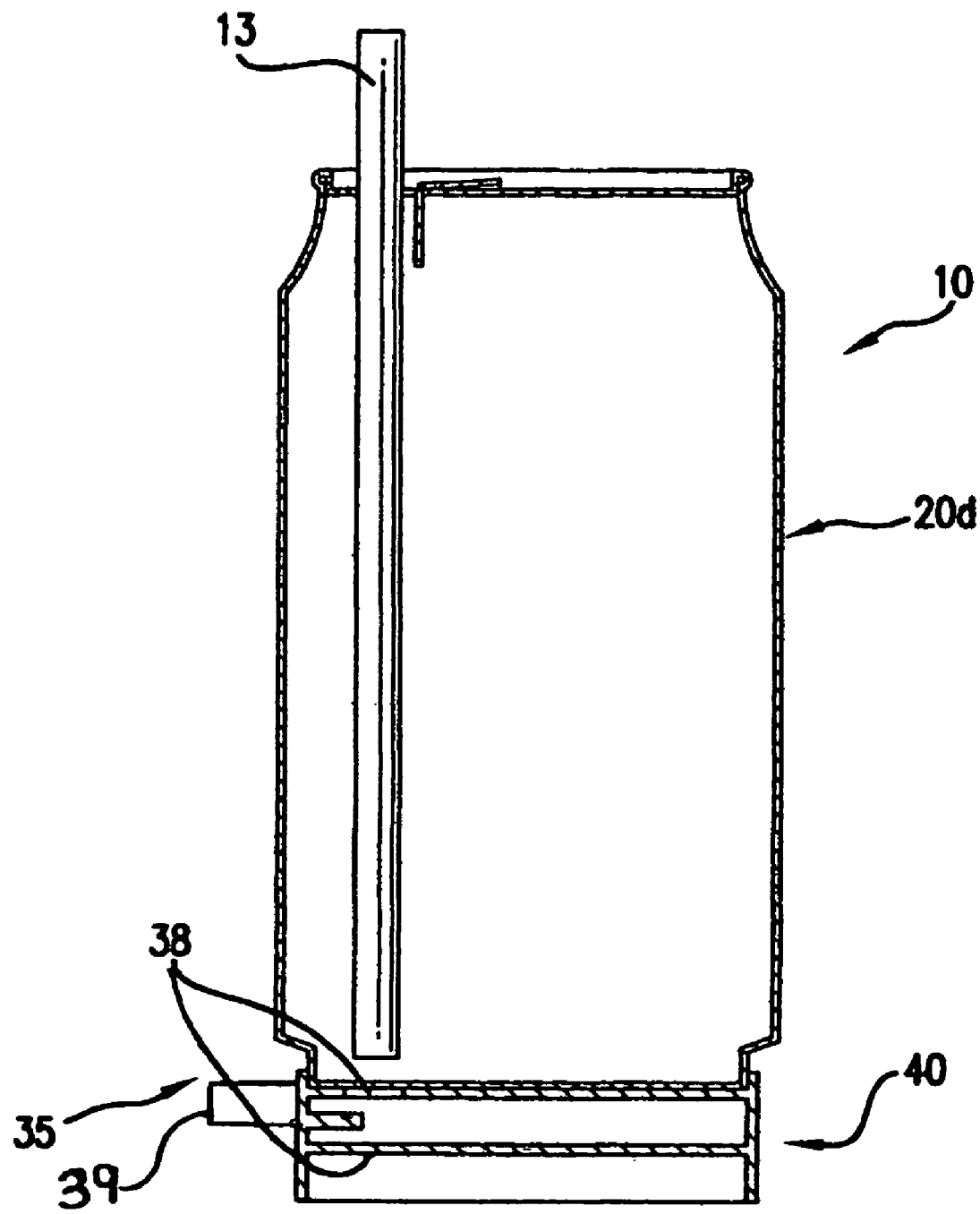
FIG. 21 is a cross-sectional view of a beverage can lid and straw device according to the present invention, showing a disk cap at the base of the can doubling as a coaster.

Referring to FIGS. 20 and 21, a factory sealed beverage sealed in a container such as a can 20d is covered by a unitary, reusable, and removable straw-containing device, called here a disk cap 40 that is a lid and straw device constructed to ft the can 20d. As a unitary container/lid/straw device, the container 20d and straw device is of three-piece construction. The disk cap 40 includes a disk cap channel 47 for holding the ring or coiled straw in the storage position, as shown in FIG. 20 with the channel longer than the length of the straw 13. The contents of the can are sealed within the can by means of a seal that can be punctured by inserting the straw 13 with pressure from the user, or by the user pulling a can tab 44 to access its contents.

Continuing with FIG. 20, the disk cap 40 fits over the top of the beverage can 20d, with the ring-shaped or coiled straw 13 supported in disk cap channel 47 in the disk cap 40, the length of the channel 47 being longer than the length of the straw 13. The can 20d is columnar in shape, so the diameter at the top of the can is substantially the same as the diameter at the bottom of the can. The disk cap 40 can be snapped on or otherwise mounted on the base 35 of the can 20d, where it acts as a coaster (see FIG. 21).

As shown in FIG. 20, a circular disk cap ledge 39 along the inside periphery of the disk cap 40 snaps onto corresponding lip projections 43 on a lip of the can 20d. In this way, or by threads or other suitable means, the disk cap 40 fits closely on the top of the can 20d. In this manner, the unitary, reusable straw-containing device is of three-piece construction. Also in FIG. 20, it can be seen that an interior extension of the circular, columnar disk cap ledge 39 is constructed horizontally within the disk cap 40 to serve as a barrier to impede the advancement of one end of the straw beyond the interior, horizontally-placed disk cap ledge 39.

As seen in FIG. 20, the disk cap 40 includes a two fingertip sized disk cap apertures (upper and lower) 38 for accessing the straw 13. The disk cap apertures 38 are made of a disposable material or preferably any material that can be manufactured to be snapped out or pulled open by the user immediately prior to use to reveal the interior straw 13 of the disk cap 40. The location of the disk cap apertures 38 correspond to the location of the lid aperture, through which the straw 13 is inserted when it is ready for use. The user opens the upper and lower disk cap apertures 38 by use of any commercially available method such as described above, inserts a tip of a finger into either one of the disk cap apertures 38 to access the straw, and pulls it out through the selected disk cap aperture 38. After both disk cap apertures 38 are opened by the user, the straw 13 can then be inserted through the upper disk cap aperture 38, down through the lower disk cap aperture 38 into the beverage once the can 20d has been opened.

As seen in FIG. 21, the disk cap 40 shows the device of three-niece construction with the straw removed from its storage position (disk channel 47 not shown) in the disk can 40 and placed in position for use by the user. Also as seen in FIG. 21, the disk cap 40 can be stored on the bottom base 35 of the can 20d, or it can be removed from the top of the can and snapped onto the can bottom base 35. On the can base 35, the disk cap 40 serves double duty as a coaster for containing condensation from a cold beverage in the can. The disk cap 40 may be empty as shown in FIG. 21, or it may contain the straw 13 when it is in place on the top or bottom, base of the can. When the disk cap 40 is on the bottom can base 35, it does not affect the stability of the can. As also can be seen in FIGS. 20 and 21, the disk cap ledge 39 is constructed so that it extends vertically slightly above the surface of the disk cap aperture 38. This feature allows the beverage straw-containing device (can 20d with disk cap 40 and straw) to be stacked.

Figure 22:
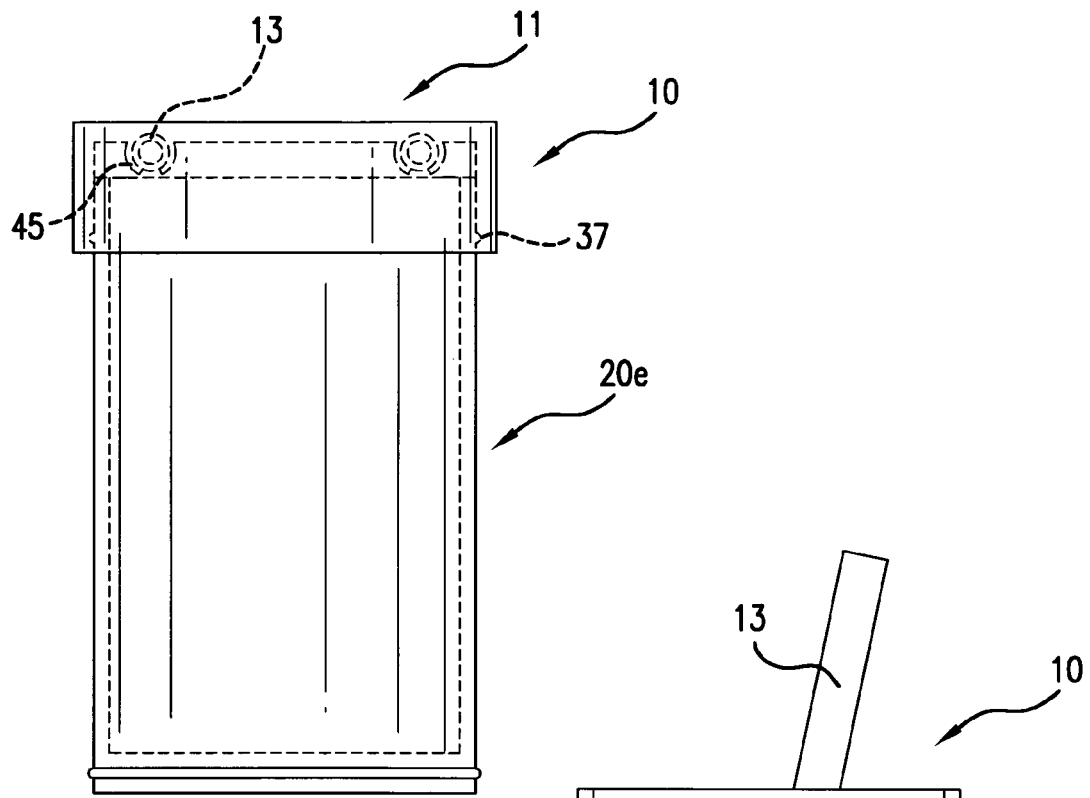
FIG. 22 is a side view of a beverage container lid and straw device according to the present invention, showing the lid on top of the beverage container.
Figure 23:
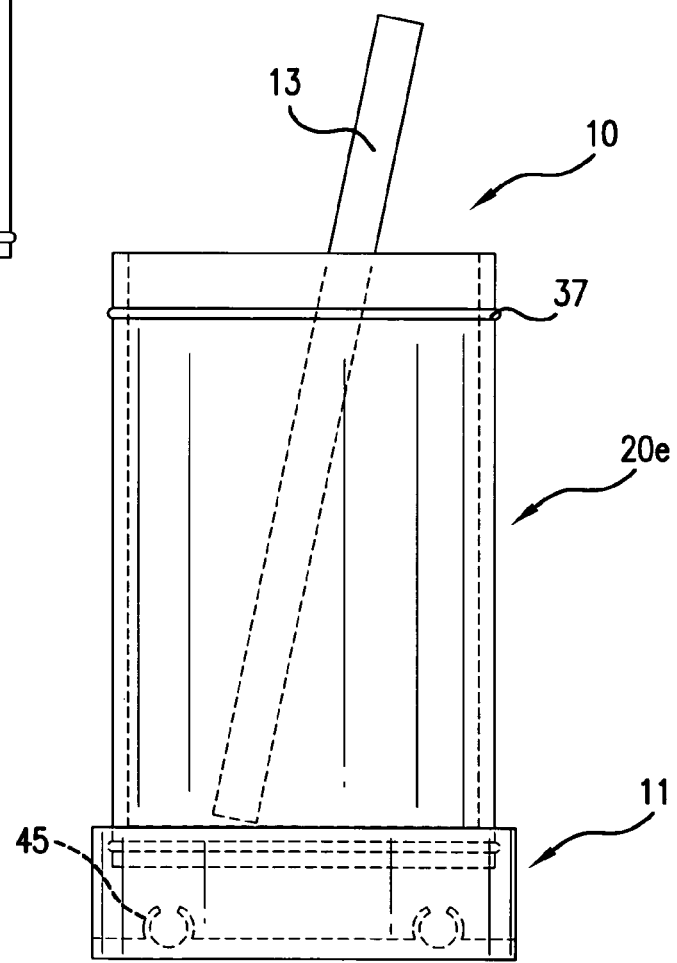
FIG. 23 is a side view of a beverage container lid and straw device according to FIG. 22, showing the lid at the base of the beverage container doubling as a coaster.

Referring to FIGS. 22 and 23, a three-piece, reusable, unitary beverage straw-containing device made up of a container lid and straw device 10 includes a container 20e in the shape of a column, where the diameter at the top of the container is substantially the same as or smaller than the diameter at the base 35 of the container 20e. The lid/straw device 10 preferably includes a container lid 11 as described hereinabove. The container lid 11 fits onto either end of the container 20e. When the container 20e is not in use, the lid 11 can be placed over the bottom of the container, as shown in FIG. 23, to act as a coaster and to reduce the likelihood that the lid will be lost. Thus, when it is on the bottom of the container, the container lid 11 collects condensation from any cold fluids in the container.

The inside of the lid 11 includes corresponding threads 37, so that the lid 11 can be snapped or screwed onto the container 20e, as shown in FIG. 22. Similarly, the outside side of the base 35 includes corresponding threading 37, so that the lid 11 can be snapped or screwed onto the base 35, with or without the straw in between. This embodiment of the unitary, reusable beverage straw-containing device of FIG. 22 is of three-piece construction.

Figure 24:
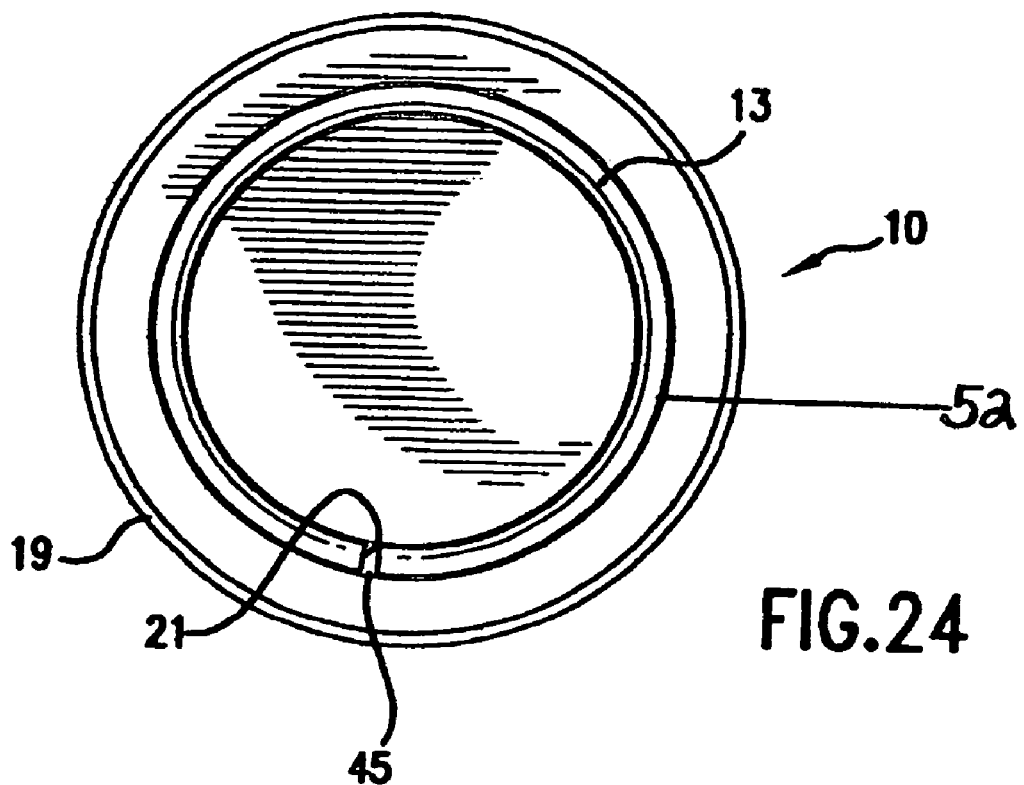
FIG. 24 is a top plan view of a beverage container lid and straw device according to the present invention.

Turning to FIG. 24, a disposable or reusable beverage container lid and straw device 10 comprises a lid 11, which comprises a ring-shaped enclosed straw lid channel 45 (constructed as a channel enclosure 52 described herein) and formed into the upper or lower surface of the lid 11 parallel to the outer rim 19 of the lid 11. The diameter of the enclosed straw lid channel 45 is only slightly larger than the diameter of the straw 13, so the ring-shaped straw 13 can be threaded into the open end of the narrow straw lid channel 45 from the bottom (or top) of the lid The length of the straw 13 is less than, longer than, or equal to the length of the straw lid channel 45. Here, the straw ends 21 do not meet, leaving an opening between the ends 21 for insertion of the user's fingernail or fingertip to facilitate removal of the straw from the otherwise enclosed straw channel opening 54. In cases where the depth of the container requires a longer straw 13 than can physically be contained in one straw channel, multiple channels can be incorporated into the lid 11, with the straw in a coiled or spiral position. For example, the lid 11 may include channels in the shape of concentric circles or spirals. The lid 11 can be placed on the beverage container 20 without, or even with, the straw 13 in the straw lid channel 45. The lid/straw devices 10 are stackable for transport and storage. They may be covered by a lid covering (not shown), if desired.

Figure 25:
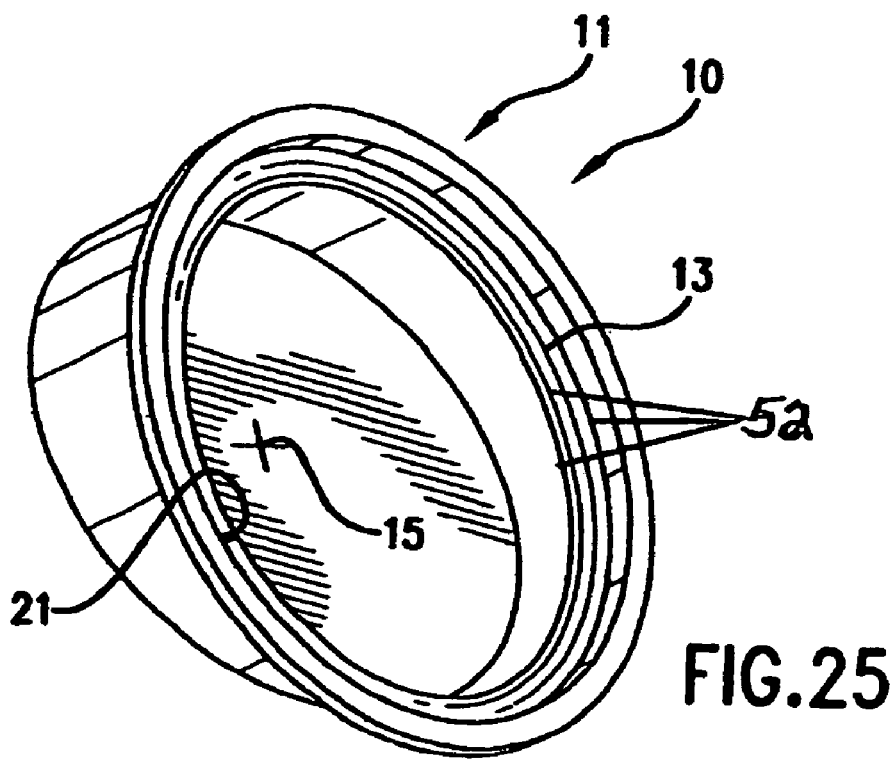
FIG. 25 is a perspective view of a beverage container lid and straw device according to the present invention.

Turning to FIG. 25, the reusable, unitary straw-containing device 10 comprises a lid 11 that is a cap, and a straw 13. As shown in FIG. 25 the ring-shaped straw 13 is enclosed and wound in a channel made in a spiral manner within an inside wall of the cap. In FIG. 25 the length of the straw 13 is more than or equal to the length of the enclosed straw lid channel 52 which has only one open end. The lid 11 can be placed on the top opening of a beverage container 20 without, or even with, the straw 13 in the cap. The straw-containing devices 10 are stackable for transport and storage. The straw in its storage position may be covered by a straw wrapper 49 (not shown) or a lid covering (not shown) may be utilized, if desired.

Figure 26:
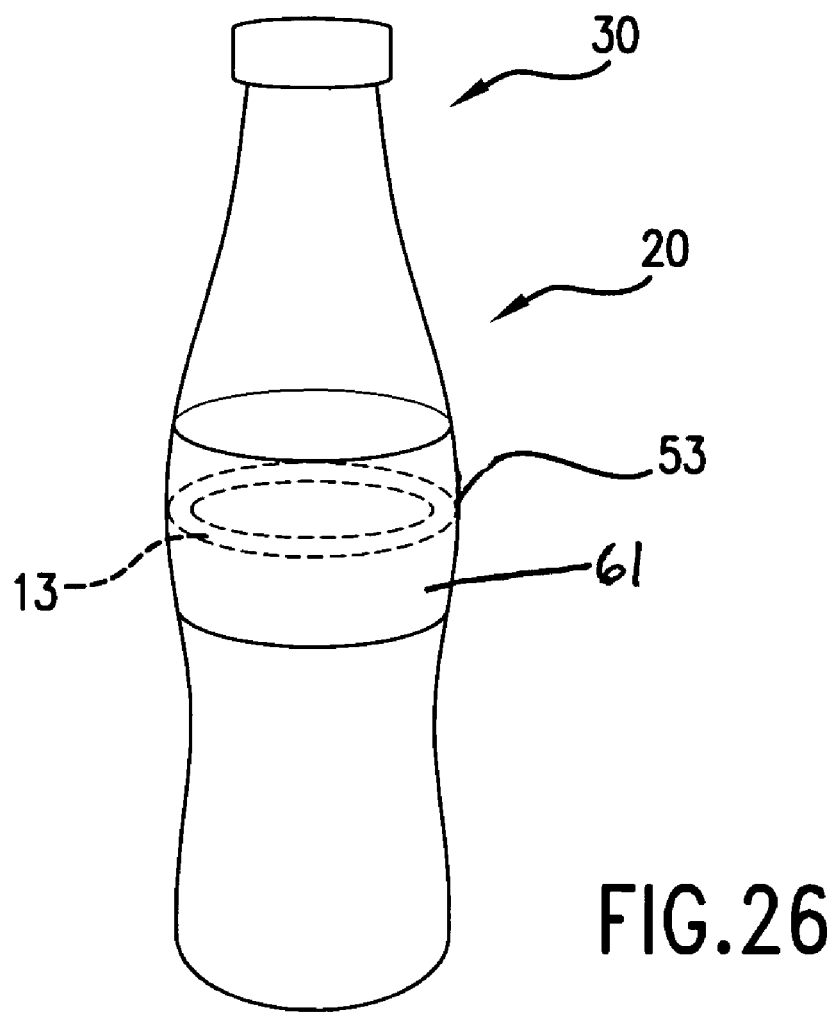
FIG. 26 is a perspective view of a beverage container and straw device according to the present invention, where the beverage container is a bottle and the straw is encased within a label on the beverage container.

Turning to FIG. 26, a beverage straw-containing device 30 of four-piece construction includes a beverage container 20 and straw that is a beverage bottle, such as a soft drink, water, juice, or beer bottle, with an open straw channel 53 around the outside of the waist (or midsection) of the bottle. The drinking straw 13 is within the channel 53 and is covered by a perforated or peel-off bottle label 61, as depicted in FIG. 26. The user peels or rips off the portion of the bottle label 61 that covers the straw and pulls the straw from the straw channel 53, then inserts the drinking straw in the bottle and drinks. Alternatively, the beverage straw-containing device is constructed with an enclosed straw channel 52 having at least one open end, revealing the drinking straw 13. The straw channel 52 and its encased drinking straw 13 are further covered by a perforated or peel-off bottle covering or label 61. The drinking straw 13 of either embodiment may be further enclosed by a straw wrapper 49.

Thus, the straw 13 of the reusable, unitary beverage straw-containing device may be self-contained in at least four different locations: 1) removably inserted in a channel in a base of the beverage container 20, 20b, 20c, 20d, 20e, 30; 2) enclosed within the top, bottom, surfaces of the container lid 11; 3) removably inserted in a channel in a lip 16, 33, 36 of the beverage container 20, 30; and 4) removably enclosed in a channel on an inside or outside surface of the beverage container 20, 30. The lid 11 and the drinking straw 13 may be packaged as one stackable item, or the beverage container 20 and the drinking straw 13 may be packaged as one stackable item. Very little counter storage space is required to store these container/lid and straw devices 10, 30. Alternatively, the lid 11, the beverage container 20, and the drinking straw 13 may be packaged as one item and separated at the time of use. When the drinking straw 13 is secured to the inside or underneath the beverage container itself, the straw 13 is removed from its location prior to dispensing the beverage into the beverage container 20.

Also included herein is a bendable, removable, generally circular-shaped, coiled, or angular drinking straw 13 enclosed within an interior or exterior surface of a beverage container 20 or a container lid 11, as described hereinabove. By "ring-shaped" here is meant that the flexible straw 13 in its storage position is bent into roughly the shape of a circle, or coiled in the shape of a spiral or concentric circles, so that it fits around the inside or outside of the beverage straw-containing device variously described herein as a straw and container lid 11 or beverage container 20. The word "lid" is meant to include "cap" here.

As depicted in FIG. 27, the straws 13 of the present invention may be encased in a fitted wrapper 49 made of paper, plastic, cellophane, or the like. The straw wrapper 49 may extend up to about 12 inch beyond the ends of the straw, and may be pulled back to reveal the straw 13. The user grasps an exposed portion of the straw 13 to remove the straw from the wrapper 49 and insert the straw into the aperture 15 in the lid 11. A portion of the wrapper 49 with the straw 13 in it may be adhered to the container lid 11 (see, for example, FIGS. 9, 12, and 24) or beverage container 20 (see, for example, FIGS. 15 and 25) for storage, and then removed for use. The straw wrapper 49 keeps the straw clean, and free of adhesive. The straw 13, with or without a wrapper, may be located anywhere on the beverage container 20 or container lid 11.

Thus, the present invention includes a beverage straw-containing device 10, 30, 40 comprising in its storage position, a flexed, or bent, drinking straw 13 removably encased within, a generally ring-shaped, coiled, or angled manner to, an interior or exterior surface of: (a) a beverage container lid 11, top, or cap, or (b) a beverage container 20 that is a drink cup, bottle, jug, mug, pouch, can, or any other beverage container suitable for imbibing liquids. In its storage position, the drinking straw 13 is flexed into a general ring-shape, or is coiled, or angled. The drinking straw 13 may be encased within a straw covering 49, which is itself attached to the beverage container 20 or container lid 11, for example. The drinking straw 13 may be encased in a lip 16 of the beverage container 20, or to any other surface of the beverage container. The beverage straw containing device 10, 11, 20, 30, 40 is unitary in that the length of the drinking straw enclosed therein is a factor or multiple of the depth of the container in which the straw will be used. The container lid 11 may be a cap. When it is in a storage position, the straw 13 is fully contained within the inside or outside surface of the beverage container 20, or the beverage lid 11 or cap. No part of the straw 13 extends beyond the container, or off the lid. The straw 13 is ring-shaped, coiled, or bent in its storage position, so that it in most cases does not extend beyond the periphery 23 of the beverage lid 11, or beyond the top or bottom of the beverage container 20. The straw-containing devices 10, 30 are therefore stackable. The straw 13 may be on the outer edge, top, or bottom of the beverage lid 11, or on the inside or outside surface of the beverage container 20. The majority of the beverage container/lid and straw devices 10, 30 described herein are stackable for shipping, storage, and convenient service.

In one embodiment herein, one end portion of the drinking straw 13 comprises a plurality of apertures 26 through which the beverage passes when the straw is in use. In this embodiment, the straw end portion 25 with the plurality of beverage apertures 26 is preferably globe-shaped, as shown in FIG. 11, and the drinking straw 13 is generally ring-shaped or spiral-shaped in the storage position.

From the foregoing it can be realized that the described device of the present invention may be easily and conveniently utilized as a beverage container lid or beverage container with a self-contained straw. It is to be understood that any dimensions given herein are illustrative, and are not meant to be limiting.

While preferred embodiments of the invention have been described using specific terms, this description is for illustrative purposes only. It will be apparent to those of ordinary skill in the art that various modifications, substitutions, omissions, and changes may be made without departing from the spirit or scope of the invention, and that such are intended to be within the scope of the present invention as defined by the following claims. It is intended that the doctrine of equivalents be relied upon to determine the fair scope of these claims in connection with any other person's product which fall outside the literal wording of these claims, but which in reality do not materially depart from this invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A reusable, unitary beverage straw-containing device of two-piece construction comprising, a container with a wholly and completely removable and replaceable, flexible, bendable drinking straw having two open ends, the straw removably encased in storage within a specially designed, closed tube having two ends with at least one end open, called a channel enclosure, the channel enclosure along a periphery of the device integrally formed by a surface of one piece of the device curving over to touch another surface of the device, the diameter of the channel enclosure slightly larger than the diameter of the straw and constructed along a horizontal plane of the device, the channel enclosure further consisting of an opening in at least one end of the enclosure that reveals one open end of the straw.

2. The reusable, unitary device according to claim 1, comprising a straw, the length of the straw being a multiple of the depth of the container, and wherein the straw is removably encased in storage within the hollow channel enclosure such that the user is able to remove, straighten, and after use, reinsert the straw, the straw when reinserted into the channel of the container, reverting to its original ring-shaped, spiral, or angled storage position.

3. The reusable, unitary device according to claim 2, wherein the straw in its horizontal storage position on the container is ring-shaped, coiled, or angled, and the channel enclosure is correspondingly ring-shaped, coiled, or angled.

4. The reusable, unitary device according to claim 1, comprising a channel enclosure that extends substantially the entire length of the straw.

5. The reusable, unitary device according to claim 1, wherein the hollow tube called the channel enclosure comprises a lip of the container.

6. The reusable, unitary device according to claim 1, wherein the drinking straw is enclosed with a removable wrapper, the straw and the wrapper further encased within the channel enclosure.

7. The reusable, unitary device according to claim 1, wherein the device is stackable, free-standing vertically.

8. The reusable, unitary device according to claim 1, wherein the straw in the straw channel enclosure extends around a surface of the container, the straw in its storage position in the channel enclosure being at least partially covered by a removable container label or covering.

9. A reusable, unitary straw-containing device according to claim 1, being of three-piece construction comprising, an integrally constructed container and container lid, the container lid with the wholly and completely removable and replaceable, flexible, bendable drinking straw.

10. A reusable, unitary straw-containing device according to claim 9, wherein the flexible, bent straw in its horizontal storage position on the container lid is ring-shaped, coiled, or angled, and the channel enclosure on the container lid, wherein the straw is housed, is correspondingly ring-shaped, coiled, or angled.

11. A reusable, unitary straw-containing device according to claim 9, wherein the length of the straw is a multiple of the circumference of the container lid, and wherein the straw is encased within the hollow channel enclosure such that the user is able to remove, straighten, and after use, reinsert the straw, with the straw, when reinserted into the channel enclosure of the container lid, reverting to its original ring-shaped, coiled, or angled storage position within the channel enclosure.

12. The reusable, unitary straw-containing device according to claim 9, comprising a channel enclosure on the container lid that extends substantially the entire length of the straw.

13. The reusable, unitary straw-containing device according to claim 9, wherein the drinking straw is enclosed within a removable wrapper, the straw with its removable wrapper encased within the channel enclosure.

14. The reusable, unitary straw-containing device according to claim 9, wherein the device is stackable, freestanding vertically.

15. The reusable, unitary straw-containing device according to claim 9, wherein the straw in the channel enclosure extends around a surface of the container lid, the straw in its storage position in the channel enclosure being at least partially covered by a removable container lid label or covering.

16. The reusable, unitary straw-containing device according to claim 9, wherein the integral container lid is removably attachable to both ends of the device, thereby alternatively serving as the container lid and as a container coaster.

17. The reusable, unitary straw-containing device according to claim 9, comprising a straw, the length of which is based upon the circumference of the container lid and the depth of the integral container, and wherein the straw is encased within the hollow channel enclosure such that the user is able to remove and replace the straw, the straw, when reinserted into the channel of the container lid reverting to its original ring-shaped, coiled, or angled storage position.

18. A reusable, unitary straw-containing device according to claim 1, being of at least three-piece construction and comprising an integrally constructed container, container lid/cap, and straw, wherein the straw in the straw-containing device in its storage position in the channel enclosure being at least partially covered by a removable container label or covering.

* * * * *